US011606436B2

(12) United States Patent
Huang et al.

(10) Patent No.: US 11,606,436 B2
(45) Date of Patent: Mar. 14, 2023

(54) IMAGE OBTAINING METHOD AND APPARATUS, SERVER, AND STORAGE MEDIUM

(71) Applicant: TENCENT TECHNOLOGY (SHENZHEN) COMPANY LIMITED, Guangdong (CN)

(72) Inventors: Gengxing Huang, Shenzhen (CN); Wei Yang, Shenzhen (CN); Xue Wei, Shenzhen (CN); Cilang Wang, Shenzhen (CN); Borui Yu, Shenzhen (CN); Zhiwei Liu, Shenzhen (CN); Guangdong Yang, Shenzhen (CN); Cheng Zeng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/443,481

(22) Filed: Jul. 27, 2021

(65) Prior Publication Data
US 2021/0360086 A1    Nov. 18, 2021

Related U.S. Application Data

(63) Continuation of application No. PCT/CN2020/092076, filed on May 25, 2020.

(30) Foreign Application Priority Data

May 29, 2019   (CN) .......................... 201910468135.3

(51) Int. Cl.
*H04N 21/478* (2011.01)
*A63F 13/355* (2014.01)
(Continued)

(52) U.S. Cl.
CPC .......... *H04L 67/131* (2022.05); *A63F 13/355* (2014.09); *G06F 9/452* (2018.02);
(Continued)

(58) Field of Classification Search
None
See application file for complete search history.

(56) References Cited

U.S. PATENT DOCUMENTS 6,687,335 B1* 2/2004 Jones ...................... H04M 1/24
                                                          379/9.01
10,387,546 B1* 8/2019 Duran .................. G06F 16/951
(Continued)

FOREIGN PATENT DOCUMENTS

CN      106371824 A      2/2017
CN      106843897 A      6/2017
(Continued)

OTHER PUBLICATIONS

MeezoTechTV, Windows tricks—Arranging windows, Feb. 8, 2016, https://www.youtube.com/watch?v=9gSeov2cGzU (Year: 2016).*
(Continued)

*Primary Examiner* — David H Chu
(74) *Attorney, Agent, or Firm* — Arentfox Schiff LLP

(57) ABSTRACT

Embodiments of this disclosure include an image obtaining method and apparatus, a server, and a storage medium. In the method, a target application process corresponding to a user identifier is obtained, by processing circuitry, from an application process set. A plurality of window image data that is currently generated is obtained, via a data obtaining module, when an image rendering function in the target application process is called. Image synthesis processing is performed on the plurality of window image data, to obtain a user interface image to be displayed. Further, a notification message that includes the user interface image is transmitted
(Continued)

to a user terminal corresponding to the user identifier for display on a user interface.

20 Claims, 14 Drawing Sheets

(51) Int. Cl.
*G09G 5/14* (2006.01)
*H04L 67/131* (2022.01)
*G06T 11/00* (2006.01)
*G06T 11/60* (2006.01)
*G06F 9/451* (2018.01)

(52) U.S. Cl.
CPC .............. *G06T 11/00* (2013.01); *G06T 11/60* (2013.01); *G09G 5/14* (2013.01); *H04N 21/4781* (2013.01); *G09G 2370/022* (2013.01); *G09G 2370/027* (2013.01)

(56) References Cited

U.S. PATENT DOCUMENTS

| | | | | |
|---|---|---|---|---|
| 2004/0239701 | A1* | 12/2004 | Crichton | G06F 3/1454 715/853 |
| 2007/0300179 | A1 | 12/2007 | Friedlander | |
| 2011/0289117 | A1* | 11/2011 | Agrawal | G06Q 10/00 707/802 |
| 2012/0066378 | A1 | 3/2012 | Lui et al. | |
| 2013/0283398 | A1* | 10/2013 | Wu | G06F 21/60 726/28 |
| 2014/0258533 | A1* | 9/2014 | Antony | H04L 67/1001 709/226 |
| 2016/0379400 | A1 | 12/2016 | Maksymczuk et al. | |
| 2017/0293419 | A1* | 10/2017 | Dipin | G06F 3/0482 |

FOREIGN PATENT DOCUMENTS

| | | |
|---|---|---|
| CN | 107071331 A | 8/2017 |
| CN | 108939556 A | 12/2018 |
| CN | 109792564 A | 5/2019 |
| CN | 110213265 A | 9/2019 |
| CN | 109582425 B | 4/2020 |
| EP | 2857931 A1 | 4/2015 |
| JP | 2003190640 A | 7/2003 |
| JP | 2004295857 A | 10/2004 |
| JP | 2016508746 A | 3/2016 |
| WO | WO2019049140 A1 | 3/2019 |

OTHER PUBLICATIONS

International Search Report Issued in Application No. PCT/CN2020/092076 dated Jul. 30, 2020, with English Translation, (5 pages).
Written Opinion Issued in Application No. PCT/CN2020/092076 dated Jul. 30, 2020 (4 pages).
Chinese Office Action Issue in Application CN201910468135.3 dated Mar. 23, 2021, with concise English Translation (6 pages).
Indian Office Action dated Mar. 17, 2022 in Application No. 202147045381.
European Search Report dated Jul. 12, 2022 in Application No. 20813666.3, pp. 1-14.
Savidis Anthony et al: "Mixing Geometrically Diverse Window Managers", Jul. 29, 2013, SAT 2015 18th International Conference, Austin, TX, USA, Sep. 24-27, 2015, Springer, Berlin, Heidelberg, pp. 714-724, ISBN: 978-3-540-74549-5.
Japanese Office Action dated Nov. 1, 2022 in Application No. 2021-548678, with English Translation, pp. 1-9.

* cited by examiner

IMAGE OBTAINING METHOD AND APPARATUS, SERVER, AND STORAGE MEDIUM

RELATED APPLICATIONS

This application is a continuation of International Application No. PCT/CN2020/092076, entitled "IMAGE ACQUISITION METHOD, DEVICE, SERVER AND STORAGE MEDIUM" and filed on May 25, 2020, which claims priority to Chinese Patent Application No. 201910468135.3, entitled "IMAGE OBTAINING METHOD AND APPARATUS, SERVER, AND STORAGE MEDIUM" and filed on May 29, 2019. The entire disclosures of the prior applications are hereby incorporated by reference in their entirety.

FIELD OF THE TECHNOLOGY

This disclosure relates to the field of internet technologies, including to an image obtaining method and apparatus, a server, and a storage medium.

BACKGROUND OF THE DISCLOSURE

Cloud gaming is an online gaming technology. In a cloud gaming scene, a game runs on a cloud server. The cloud server renders a game scene into a game picture and transmits the game picture to a user terminal in real time, for a user on the user terminal to input a corresponding operation for the game picture. As can be seen, the cloud gaming can implement running of a high-quality game on a user terminal with relatively limited graphics processing and data computing capabilities.

Due to the foregoing advantage, the cloud gaming has become a research hotspot in the gaming field in recent years. One of the key problems involved in the study of cloud gaming is how a cloud server obtains a game picture of a currently running game. A commonly used method to resolve this problem is to obtain a picture based on a virtual machine. Specifically, a virtual machine is configured for each user terminal, the virtual machine renders a game scene to obtain a game picture, and the cloud server directly intercepts a desktop of the virtual machine to obtain the game picture. However, this method requires deployment of a large number of virtual machines, which occupies a large amount of server resources, thereby resulting in waste of server resources.

SUMMARY

Embodiments of this disclosure include an image obtaining method and apparatus, a server, and a non-transitory computer-readable storage medium. The server obtains (e.g., intercepts) window image data generated during running of a target application, and performs synthesis processing on the window image data, to obtain a user interface image to be displayed corresponding to the target application. Compared with the manner of obtaining a user interface image by using a virtual machine in the related art, resource overheads for configuring the virtual machine are reduced.

In one aspect, an embodiment of this disclosure provides an image obtaining method. The method is applicable to a server for example. In the method, a target application process corresponding to a user identifier is obtained, by processing circuitry, from an application process set. A plurality of window image data that is currently generated is obtained, via a data obtaining module, when an image rendering function in the target application process is called. Image synthesis processing is performed on the plurality of window image data, to obtain a user interface image to be displayed. Further, a notification message that includes the user interface image is transmitted to a user terminal corresponding to the user identifier for display on a user interface.

In another aspect, an embodiment of this disclosure provides an image obtaining apparatus including processing circuitry. The image obtaining apparatus is implemented by a server for example. The processing circuitry is configured to obtain, from an application process set, a target application process corresponding to a user identifier. The processing circuitry is configured to obtain, via a data obtaining module, a plurality of window image data that is currently generated when an image rendering function in the target application process is called. The processing circuitry is configured to perform image synthesis processing on the plurality of window image data, to obtain a user interface image to be displayed. Further, the processing circuitry is configured to transmit a notification message that includes the user interface image to a user terminal corresponding to the user identifier for display on a user interface.

In still another aspect, an embodiment of this disclosure provides a server. The server includes a processor and a computer-readable storage medium. The processor is suitable for implementing one or more instructions. The computer storage medium, storing one or more instructions, the one or more instructions being suitable to be loaded by the processor to perform the image obtaining method described above.

In still another aspect, an embodiment of this disclosure provides a non-transitory computer-readable storage medium, storing instructions, which when executed by a processor cause the processor to perform the image obtaining method described above. For example, a target application process corresponding to a user identifier is obtained from an application process set. A plurality of window image data that is currently generated is obtained, via a data obtaining module, when an image rendering function in the target application process is called. Image synthesis processing is performed on the plurality of window image data, to obtain a user interface image to be displayed. Further, a notification message that includes the user interface image is transmitted to a user terminal corresponding to the user identifier for display on a user interface.

BRIEF DESCRIPTION OF THE DRAWINGS

To describe the technical solutions of the embodiments of this disclosure or the related technology more clearly, the following briefly introduces the accompanying drawings required for describing the embodiments or the related technology. The accompanying drawings in the following description show some embodiments of this disclosure, and a person skilled in the art may still derive other drawings from these accompanying drawings.

DESCRIPTION OF EMBODIMENTS

The following describes technical solutions in embodiments of this disclosure with reference to the accompanying drawings in the embodiments of this disclosure.

Figure 1:
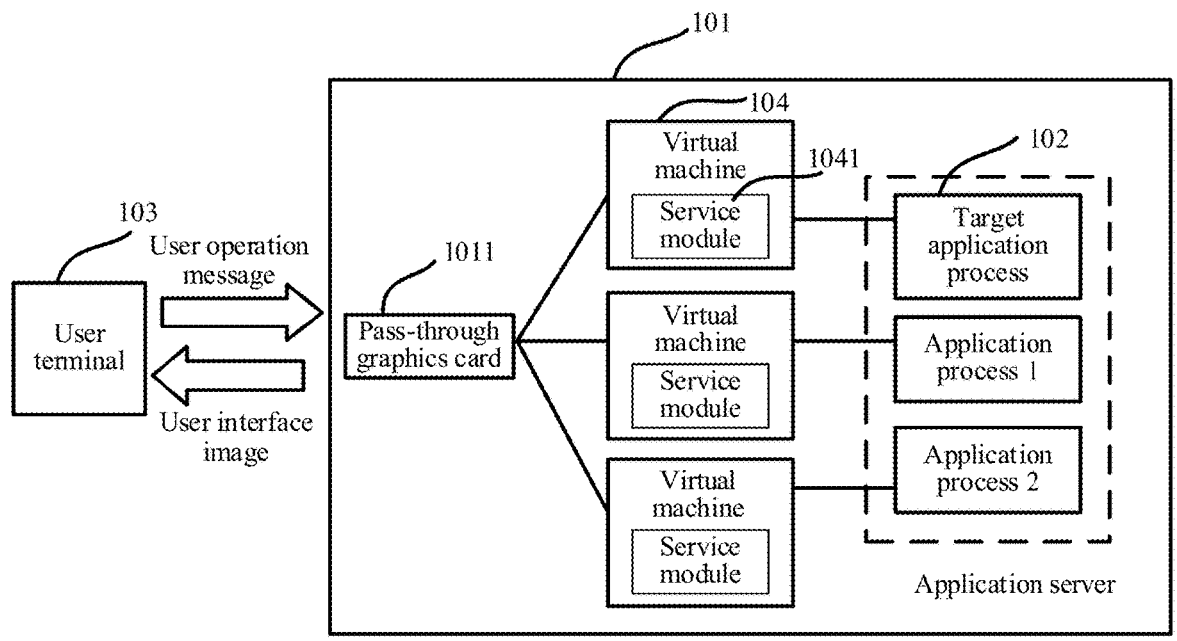
FIG. 1 is an exemplary schematic architecture diagram of image obtaining.

In an implementation in which a user terminal obtains an image from a server, an architecture diagram of image obtaining may be shown in FIG. 1. In FIG. 1, application server 101 represents an application server, on which a plurality of application processes may run. Target application process 102 represents a target application process corresponding to a user identifier among the plurality of application processes. User terminal 103 represents a user terminal that logs in to the target application by using the user identifier. Virtual machine 104 represents a virtual machine corresponding to the user terminal 103. It is to be understood that, to ensure normal running of the target application in the user terminal, the application server needs to provide service support for the running of the target application. In other words, the application server is configured to execute an application process set that provides service support for implementing an application function of the target application. The target application may be any application, such as a game application, an instant messaging application, and a shopping application.

The application server provides service support for the target application based on a service program related to the target application. For example, the application server may support the target application to implement the application function by executing the service program. In the field of computers, an activity of the application server running the service program can be referred to as an application process. If the target application runs on a plurality of user terminals simultaneously, to ensure that running of the target application in the user terminals does not interfere with each other, the application server creates an application process for each user to support running of the target application for the respective users. That is, the application server may execute an application process set that provides service support for implementing the application function of the target application. The application process set includes a plurality of application processes, and each application process corresponds to a user identifier. The target application process described in this embodiment of the disclosure may refer to an application process corresponding to any user identifier.

For example, in a cloud gaming application scenario, assuming that the target application is a game application, if a user A and a user B start the game application at the same time by using different user terminals, the application server creates, upon detection of operation instructions of the user A and the user B on the game application, an application process A and an application process B respectively for the user A and the user B, to support the players of the two user terminals to experience the game application.

In the architecture diagram of image obtaining shown in FIG. 1, if the application server 101 receives an operation instruction transmitted by the user terminal 103 for the target application, the application server 101 notifies the virtual machine 104 corresponding to the user identifier in the user terminal 103 to run the target application process 102, and other virtual machines run an application process 1 and an application process 2 respectively. The application server 101 obtains a user interface image corresponding to the user identifier by running the target application on the virtual machine 104. In some embodiments, a manner of obtaining the user interface image corresponding to the user identifier by using the virtual machine may be: the virtual machine 104 calls an image rendering function of the target application process 102 to perform rendering and obtain rendered window image data; the virtual machine 104 then performs synthesis processing on the window image data and other parameters to obtain an image to be displayed; the image to be displayed is displayed in the user interface of the virtual machine 104; and the application server 101 intercepts a current user interface of the virtual machine 104, uses the intercepted image as the user interface image corresponding to the user identifier, and transmits the user interface image to the user terminal 103. In this way, a user identified by the user identifier can view the user interface image corresponding to the target application process 102 by using the user terminal 103.

Figure 2:
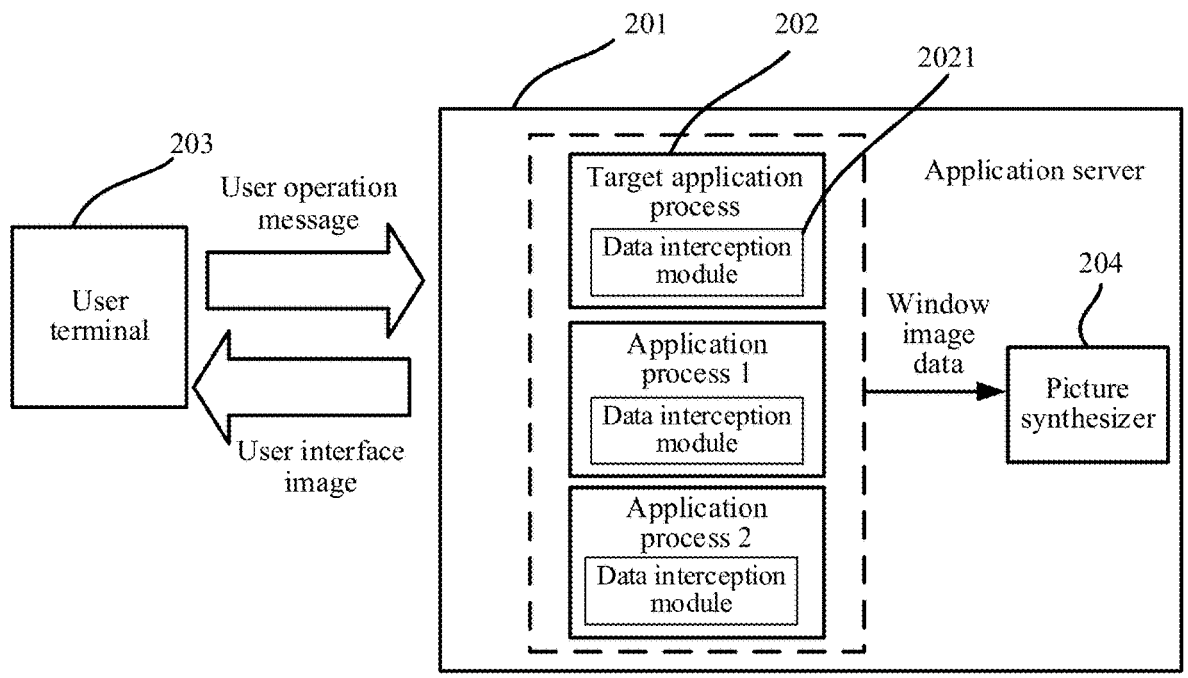
FIG. 2 is an architectural diagram of image obtaining according to an embodiment of this disclosure.

In an embodiment, the architecture diagram of image obtaining may be alternatively as shown in FIG. 2. In the architecture diagram of image obtaining shown in FIG. 2, application server 201 represents an application server, and an application process set that provides service support for an application function of a target application runs on the application server 201; target application process 202 represents a target application process corresponding to a user identifier in the application process set; and user terminal 203 represents a user terminal that logs in to the target application by using the user identifier, that is, a user terminal corresponding to the user identifier. In this embodiment of the disclosure, a data interception module is further configured in each application process in the application process set. For example, a data interception module 2021 is configured in the target application process, a data interception module is configured in an application process 1, and a data interception module is configured in an application process 2.

In an embodiment, during running of the target application process 202, the application server 201 may call the data interception module 2021 in the target application process 202 to intercept window image data. The window image data are obtained when an image rendering function in the target application process 202 is executed to perform rendering. Then image synthesis processing is performed on the window image data to obtain a user interface image to be displayed. In some embodiments, a picture synthesizer 204 may be configured in the application server 201, and the application server 201 may transmit the window image data intercepted by calling the data interception module to the picture synthesizer 204, to call the picture synthesizer 204 to perform image synthesis processing on the window image data to obtain the user interface image to be displayed. After obtaining the user interface image, the application server 201 transmits a notification message carrying the user interface image to the user terminal 203, so that the user terminal 203 displays the user interface image on a user interface.

By comparing the architecture diagrams of image obtaining shown in FIG. 1 and FIG. 2, it can be found that in FIG. 1, a corresponding virtual machine needs to be deployed for each user identifier, so that an application process corresponding to each user identifier runs on the corresponding virtual machine. When a large number of virtual machines are deployed, many resource overheads need to be consumed. In addition, because a graphics card in a virtual machine cannot support multimedia well, when the virtual machine is deployed, a high-performance graphics card needs to be independently configured in the application server 101 for the virtual machine to use, as shown by 1011 in FIG. 1. However, the high-performance graphics card 1011 is used only to support multimedia services in the virtual machine and is in an idle state in other cases, resulting in low utilization of the graphics card and waste of costs.

In addition, to implement communication among the application server 101, the virtual machine 104, and the target application process 102 in FIG. 1, a corresponding service module needs to be further deployed in the virtual machine 104, as shown by 1041 in FIG. 1. Generally, operation permission of the user to the virtual machine by using the service module 1041 is controlled by user permission. In this way, it is easy for some malicious users to break through permission control, and steal and destroy information by using the service module 1041, resulting in poor security of image obtaining.

In addition, in the architecture diagram shown in FIG. 1, each application process runs on a corresponding virtual machine instead of running on the application server, resulting in low running efficiency of the application processes.

Compared with FIG. 1, in the architecture diagram of image obtaining shown in FIG. 2, no virtual machine is deployed and resource consumption can be reduced. In addition, the application server 201 only displays the user interface image related to the target application process to the user terminal 203, which improves security of the application. Moreover, in the architecture diagram of image obtaining shown in FIG. 2, the application processes directly run on the application server 201 instead of running on the virtual machines, which improves the running efficiency of the application processes. In view of the above, an embodiment of this disclosure based on the image obtaining architecture shown in FIG. 2 is described in detail below.

Based on the architecture diagram of image obtaining described in FIG. 2, an embodiment of this disclosure provides an image obtaining method. The image obtaining method is applicable to an application server. The application server is configured to execute an application process set that provides service support for implementing an application function of a target application, such as the application server 101 in FIG. 1, or the application server 201 in FIG. 2. By using the image obtaining method described in this embodiment of the disclosure, a user interface image corresponding to a user identifier can be obtained, and the obtained user interface image is carried in a notification message and transmitted to a user terminal corresponding to the user identifier, to instruct the user terminal to display the user interface image on a user interface. In this way, a user identified by the user identifier can operate a target application by using the user interface image. Compared with the manner of obtaining a user interface image to be displayed by using a virtual machine in the related art, through this embodiment of the disclosure, resource overheads of deploying the virtual machine in the application server can be reduced.

In an embodiment, the image obtaining method described in this embodiment of the disclosure is applicable to an application scenario of cloud gaming. The cloud gaming can refer to: games corresponding to a plurality of user identifiers run on a cloud server, and the cloud server renders a game scene in each game into a game picture or screen, and transmits the game picture to a user terminal corresponding to each user identifier in real time, so that a user identified by each user identifier inputs a corresponding operation for a game picture.

Figure 3A:
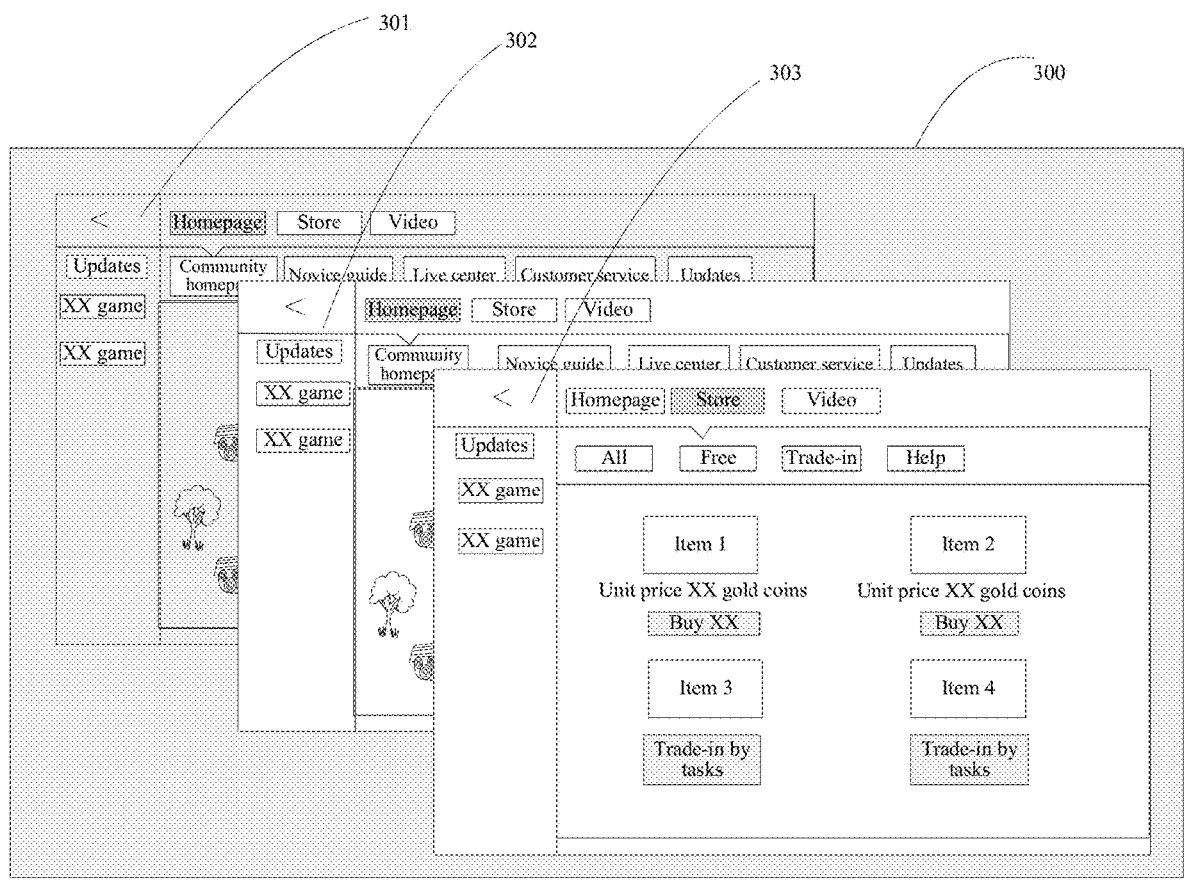
FIG. 3a is a desktop view of a cloud server according to an embodiment of this disclosure.

When this embodiment of the disclosure is applied to the application scenario of the cloud gaming, the application server is equivalent to the cloud server, and the user interface image is equivalent to the game picture. For example, FIG. 3a is a desktop view of a cloud server according to an embodiment of the disclosure. For example, the cloud server is the application server 101 in FIG. 1 or the application server 201 in FIG. 2, and 300 in FIG. 3a represents a desktop of the cloud server. In FIG. 3a, a plurality of application processes that support running of a game run on the cloud server at the same time. By using the image obtaining method described in this embodiment of the disclosure, the cloud server can obtain game pictures corresponding to the plurality of application processes. The game pictures such as game picture 301, game picture 302, and game picture 303 corresponding to each application process may be displayed in the desktop view of the cloud server at the same time. Because one application process corresponds to one user identifier, a game picture corresponding to each application process is a game picture corresponding to each user identifier. For example, game picture 301 represents a game picture corresponding to a user identifier A, game picture 302 represents a game picture corresponding to a user identifier B, and game picture 303 represents a game picture corresponding to a user identifier C.

Figure 3B:
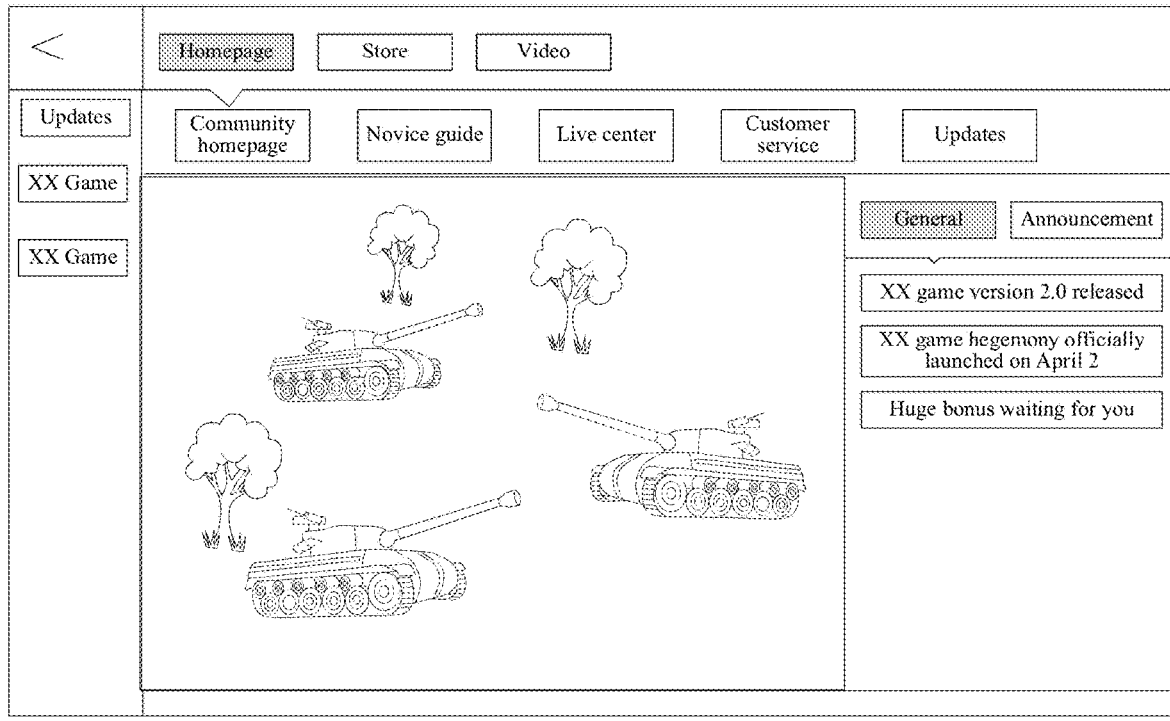
FIG. 3b is a schematic diagram of a user interface image according to an embodiment of this disclosure.

By using the image obtaining method described in this embodiment of the disclosure, a game picture corresponding to each user identifier can be respectively transmitted to a corresponding user terminal for display. For a user identified by a user identifier, a game picture seen in the user interface of the user terminal is a game picture corresponding to the user identifier in the cloud server, and a game picture corresponding to another user identifier is not displayed. That is, games corresponding to users do not interfere with each other. For example, FIG. 3b is a user interface image of a user terminal corresponding to the user identifier A among the plurality of user identifiers. For example, the user terminal is the user terminal 103 in FIG. 1 and the user terminal 203 in FIG. 2. As can be seen, a user interface of the user terminal corresponding to the user identifier A only displays the game picture 301 corresponding to the user identifier A.

Figure 4:
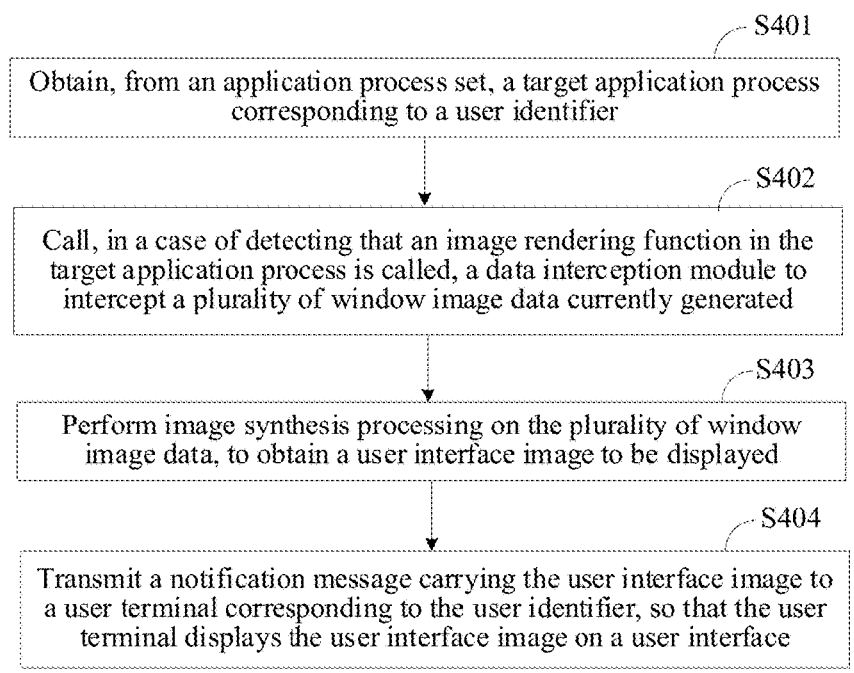
FIG. 4 is a schematic flowchart of an image obtaining method according to an embodiment of this disclosure.

Based on the foregoing descriptions, an embodiment of the disclosure provides a schematic flowchart of an image obtaining method, as shown in FIG. 4. The image obtaining method described in FIG. 4 may be performed by a server, and specifically, may be performed by a processor of the server. For example, the method is applicable to the application server 101 shown in FIG. 1 or the application server 201 shown in FIG. 2, and the application server is configured to execute an application process set that provides service support for implementing an application function of a target application. The image obtaining method described in FIG. 4 may include the following steps.

In step S401, a target application process corresponding to a user identifier is obtained from an application process set.

The user identifier is used for indicating an identity of a user, and the user identifier may include any one or more of an ID card of the user, a mobile phone number of the user, and a login account of the user.

In an embodiment, the obtaining a target application process corresponding to a user identifier may be performed after the application server receives a user operation request transmitted by a user terminal. The user terminal refers to a terminal device that is logged in based on the user identifier. The terminal device may include any device capable of decompressing a video, such as a mobile phone, a tablet, and a desktop computer. The user operation request may include any one or more of a login operation, a window switching operation, and a logout operation for a target application.

For example, if the user indicated by the user identifier logs in to the target application in the user terminal for the first time, in this case, the user operation request transmitted by the user and received by the user terminal may refer to a login operation. If the target application is logged in to the user terminal based on the user identifier, in this case, a user operation message may refer to a logout operation, or a window switching operation on each window included in the target application, or a request to run an application function of the target application, or the like.

In step S402, when detecting that an image rendering function in the target application process is called, a data interception module is called to intercept a plurality of window image data currently generated. In an example, a data obtaining module obtains the plurality of window image data currently generated.

Figure 5A:
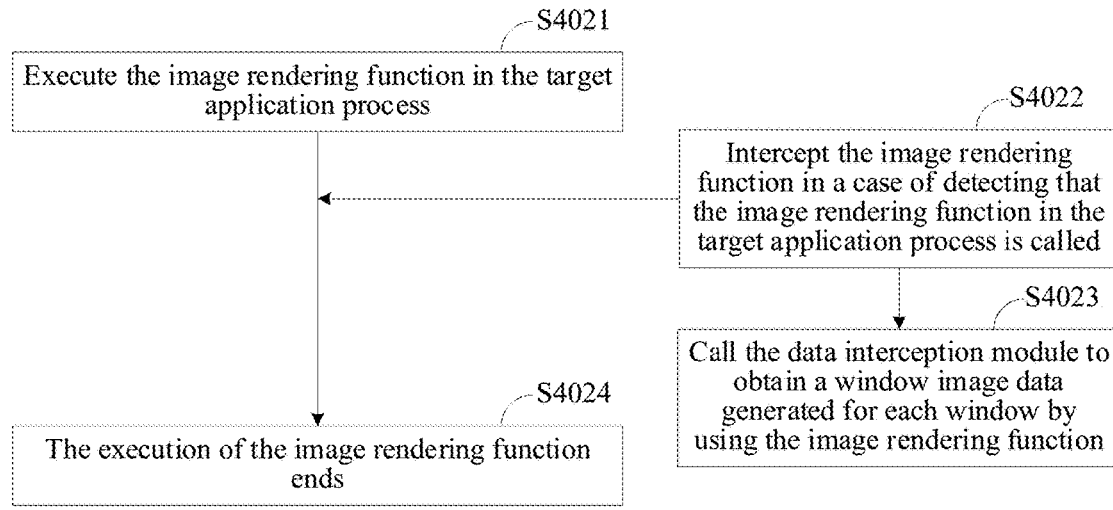
FIG. 5a is a schematic diagram of obtaining window image data according to an embodiment of this disclosure.

In this step, the window image data are obtained when the image rendering function in the target application process is executed during running the target application process. For example, an implementation of calling the data interception module to intercept the window image data currently generated is as shown in FIG. 5a. FIG. 5a is a schematic diagram of obtaining window image data according to an embodiment of this disclosure. The obtaining method may be performed by a server, for example, the application server 101 in FIG. 1 or the application server 201 in FIG. 2. The method includes the following steps.

In step S4021, the image rendering function is executed in the target application process.

In step S4022, the image rendering function is intercepted when detecting that the image rendering function in the target application process is called.

In step S4023, the data interception module is called to obtain a window image data generated for each window by using the image rendering function.

In step S4024, the execution of the image rendering function ends.

Image rendering can refer to a process of transferring, processing and converting three-dimensional light energy transfer process into a two-dimensional image, and the image rendering function can refer to a function that can implement a function of image rendering.

Commonly used image rendering manners in the image rendering function may include: Open Graphics Library (OpenGL), Graphics Device Interface (GDI), and programming interface DirectX. OpenGL is a bottom 3D graphics library that only provides a rendering function and may be ported between different platforms; DirectX mainly provides hardware support for GPU designs and is more suitable for image rendering of game applications; and GDI is designed for broad spectrum and may be also applied to image rendering of game applications, but an effect thereof is not as good as that of DirectX.

In an embodiment, when rendering is performed for different windows, a rendering manner for each window in the image rendering function of the target application process may be different. For example, when a first window of the target application is rendered, the rendering manner included in the image rendering function may be GDI; and when a second window of the target application is rendered, the rendering manner included in the image rendering function may be OpenGL.

Figure 5B:
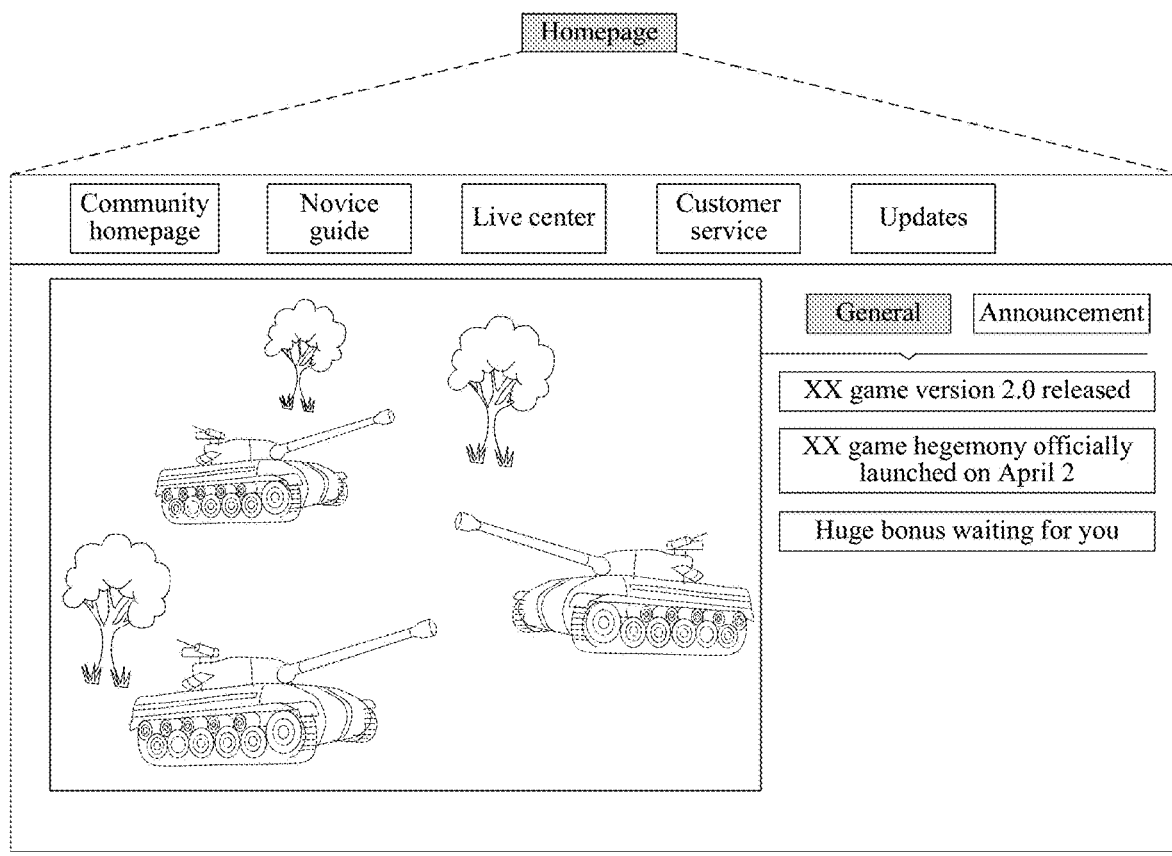
FIG. 5b is a schematic diagram of window image data according to an embodiment of this disclosure.
Figure 5C:
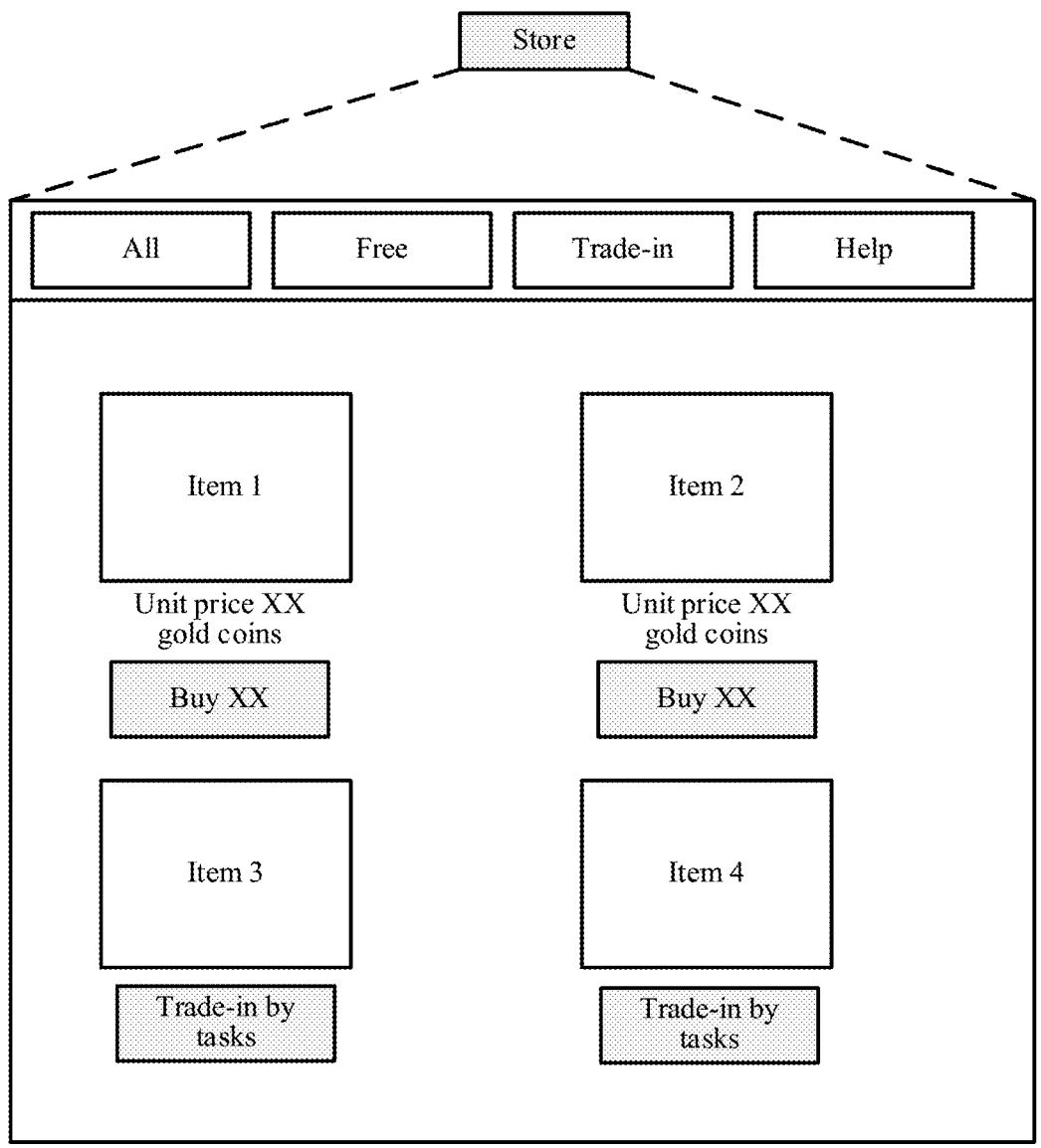
FIG. 5c is a schematic diagram of another window image data according to an embodiment of this disclosure.
Figure 5D:
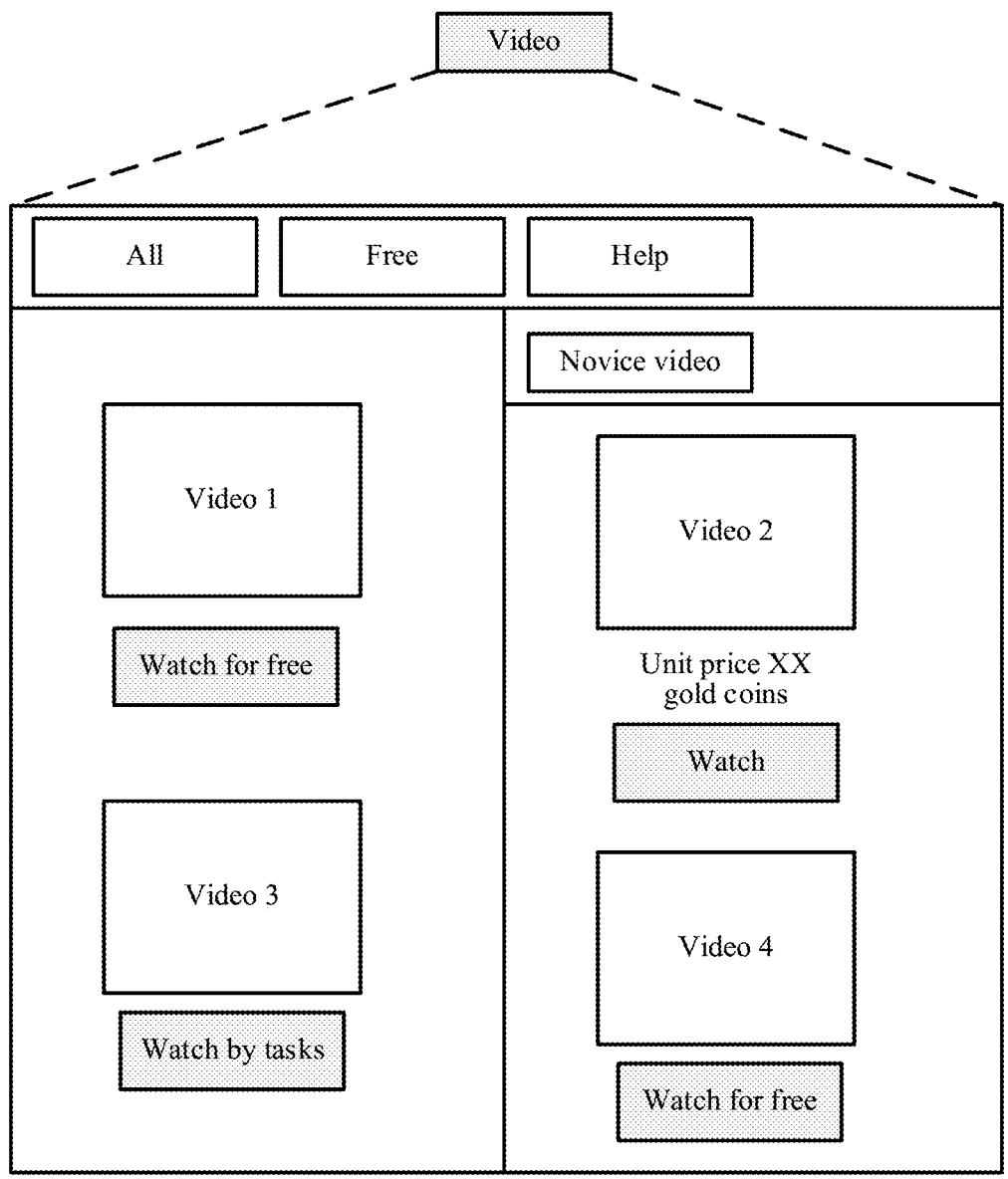
FIG. 5d is a schematic diagram of still another window image data according to an embodiment of this disclosure.

In an embodiment, FIG. 5b to FIG. 5d are schematic diagrams of window image data according to an embodiment of this disclosure. Assuming that the target application is a game application, the game application may include three windows, namely, a "homepage" window, a "store" window, and a "video" window. Each window corresponds to window image data. For example, "homepage" window image data is shown in FIG. 5b, "store" window image data is shown in FIG. 5c, and "video" window image data is shown in FIG. 5d.

In step S403, image synthesis processing is performed on the plurality of window image data, to obtain a user interface image to be displayed.

In an embodiment, the image synthesis processing may refer to sequentially superimposing the plurality of window image data according to a synthesis order of the plurality of window image data. The synthesis order may refer to an order in which the plurality of window image data are processed during the image synthesis processing, and a window image data with an earlier synthesis order is processed sooner during the image synthesis processing. The synthesis order may be determined according to window hierarchy identifiers corresponding to the plurality of window image data. The window hierarchy identifiers are each used for indicating a hierarchy of a window. A higher hierarchy indicated by the window hierarchy identifier indicates a later synthesis order of the window image data.

For example, assume that in FIG. 5b to FIG. 5d, a descending order of window hierarchy identifiers of the three window image data are sequentially "video", "store", and "homepage". According to the foregoing description that window image data with a higher window hierarchy identifier has a later synthesis order, the synthesis order of the three window image data in FIG. 5b to FIG. 5d may be "homepage", "store", and "video". If synthesis processing is performed on the three window image data according to the synthesis order, a user interface image to be displayed obtained may be as shown in FIG. 3b. For example, the application server may call a picture synthesizer to perform synthesis processing on the plurality of window image data.

In step S404, a notification message carrying the user interface image is transmitted to a user terminal corresponding to the user identifier, so that the user terminal displays the user interface image on a user interface.

The notification message is used for instructing the user terminal to display the user interface image on the user interface. A schematic diagram of the user terminal displaying the user interface image on the user interface may be shown in FIG. 3b.

Compared with the manner of obtaining a user interface image by deploying a virtual machine in the related art, in this embodiment of the disclosure, the application server calls a rendering function to obtain window image data and performs image synthesis processing on the window image data to obtain a user interface image in a process of intercepting and executing the target application, which can reduce resource overheads of the application server.

Figure 6A:
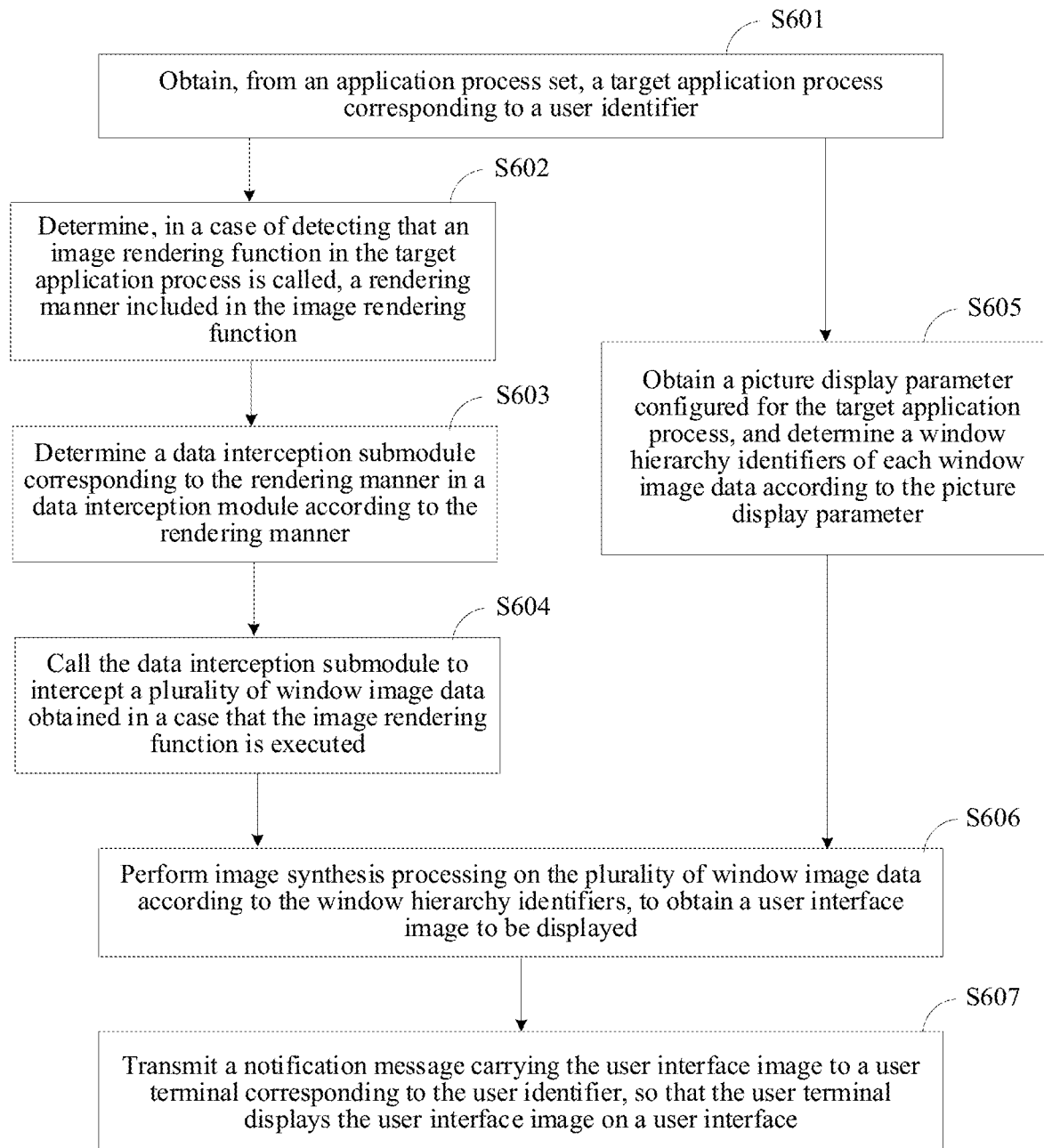
FIG. 6a is a schematic flowchart of another image obtaining method according to an embodiment of this disclosure.

FIG. 6a is a schematic flowchart of another image obtaining method according to an embodiment of the disclosure. The image obtaining method described in FIG. 6a may be performed by a server, and for example, may be performed by a processor of the server. For example, the method is applicable to the application server 101 shown in FIG. 1 or the application server 201 shown in FIG. 2, and the application server is configured to execute an application process set that provides service support for implementing an application function of a target application. The image obtaining method described in FIG. 6a may include the following steps:

In step S601, a target application process corresponding to a user identifier is obtained from an application process set.

This step can be the same as step 401, and details are not described herein again.

In step S602, a rendering manner included in the image rendering function is determined when detecting that an image rendering function in the target application process is called.

There can be a plurality of window image data. The plurality of window image data can be obtained by executing one or more image rendering functions of the target application. The rendering manner included in each image rendering function may be any of OpenGL, GDI and DirectX.

In step S603, a data interception submodule corresponding to the rendering manner in a data interception module is determined according to the rendering manner.

The data interception module may include three interception submodules, and the three interception submodules respectively correspond to the foregoing three rendering manners. For example, the three interception submodules included in the data interception module may be an OpenGL interception submodule, a GDI interception submodule, and a DirectX interception submodule. In some embodiments, correspondences between the interception submodules and the rendering manners may be: the rendering manner corresponding to the OpenGL interception submodule is OpenGL, the rendering manner corresponding to the GDI interception submodule is GDI, and the rendering manner corresponding to the DirectX interception submodule is DirectX. It is to be understood that calling an interception submodule corresponding to a rendering manner to obtain window image data can ensure the accuracy of the intercepted window image data.

Figure 8:
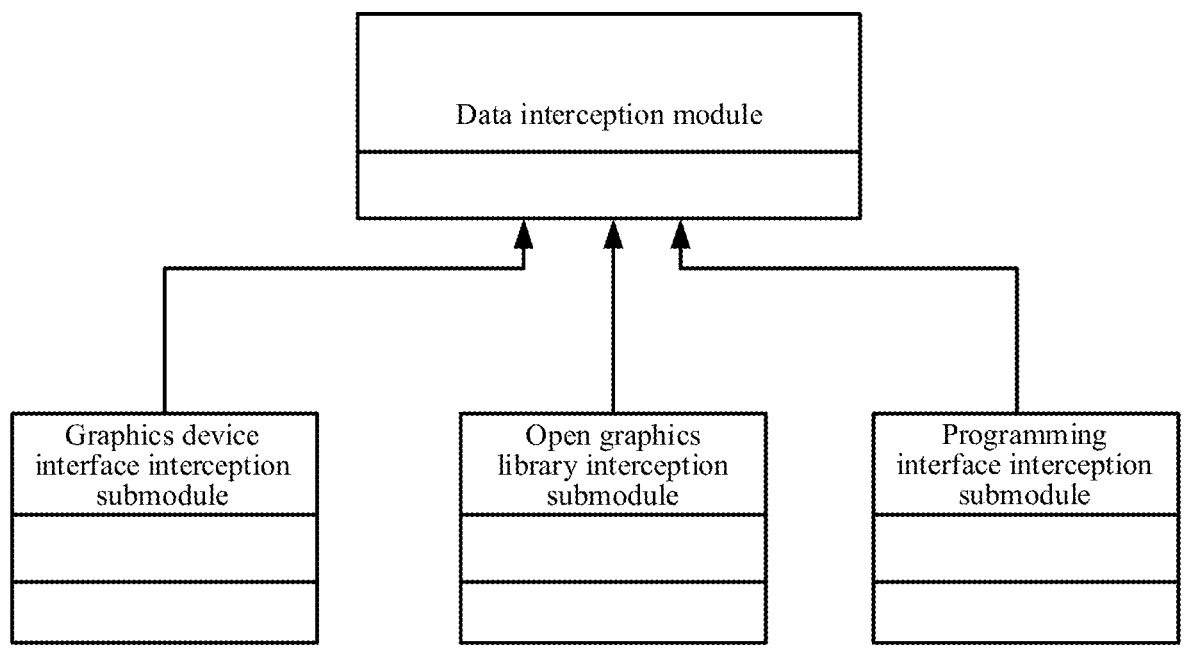
FIG. 8 is a schematic diagram of a data interception module according to an embodiment of this disclosure.

In an embodiment, a schematic diagram of the data interception module provided in this embodiment of the disclosure may be shown in FIG. 8. The data interception module shown in FIG. 8 may include the GDI interception submodule, the DirectX interception submodule, and the OpenGL interception submodule.

In step S604, the data interception submodule is called to intercept a plurality of window image data obtained when the image rendering function is executed.

While performing steps S602 to S604, step S605 in the following may be further performed:

In step S605, a picture display parameter configured for the target application process is obtained, and a window hierarchy identifier of each window image data is determined according to the picture display parameter.

The picture display parameter may include any one or more of whether a window corresponding to each window image data is minimized or maximized, and an arrangement relationship between the windows. For example, the arrangement relationship between the windows may be that a window A is placed before a window B, a window C is placed behind the window B, and the like.

In an embodiment, the picture display parameter may be stored in a sandbox. The sandbox described in this embodiment of the disclosure is a mechanism that can isolate a plurality of application processes running on the application server from each other.

In an embodiment, the picture display parameter configured for the target application process and stored in the sandbox may be a parameter set by default for the target application process by the application server. For example, assuming that the target application is a game application, a parameter set by the application server for the target application process configured to provide support for implementing a game function of the game application may include: a window corresponding to "homepage" window image data is placed at the front-most position for display, a window corresponding to "store" window image data is placed behind the window corresponding to the "homepage" window image data, and a window corresponding to "video" window image data is placed behind the window corresponding to the "store" window image data. In this case, the picture display parameter may be: the "homepage" window image data is placed at the front-most position for display, the "store" window image data is placed behind the "homepage" window image data, and the "video" window image data is placed behind the "store" window image data.

In another embodiment, the picture display parameter configured for the target application process and stored in the sandbox may be determined according to a user operation request transmitted by a user terminal and parameters set by default for the target application process by the application server. For example, assuming that the target application is a game application, the parameter configured for the target application process configured to provide service support for implementing a game function of the game application may include: the window corresponding to the "homepage" window image data is placed at the front-most position for display, the window corresponding to the "store" window image data is placed behind the window corresponding to the "homepage" window image data, and the window corresponding to the "video" window image data is placed behind the window corresponding to the "store" window image data. It is detected that the user operation request includes switching from the window corresponding to the "homepage" window image data to the window corresponding to the "video" window image data. In this case, the picture display parameter determined according to the user operation request and the parameters set by default for the application by the application server may include: the window corresponding to the "video"

window image data is placed at the front-most position for display, the window corresponding to the "store" window image data is placed behind the window corresponding to the "homepage" window image data, and the window corresponding to the "homepage" window image data is placed behind the window corresponding to the "video" window image data.

After the picture display parameter configured for the target application process is obtained, the window hierarchy identifiers of the plurality of window image data may be determined according to the picture display parameter. The window hierarchy identifiers are each used for uniquely representing corresponding window image data, and the window hierarchy identifiers indicate a hierarchical relationship between window image data.

The window hierarchy identifiers may be each represented by one or more numbers, such as 1, 2, 3, or (1, 2), (2, 1), (3, 1); or the window hierarchy identifiers may be alternatively represented in other forms. In this embodiment of the disclosure, when the window hierarchy identifiers are represented by using numbers: If quantities of numbers used to represent the window hierarchy identifiers are different, a greater quantity of numbers indicates a higher window hierarchy identifier. For example, a window hierarchy identifier represented by (1, 2) is higher than a window hierarchy identifier represented by 1. If quantities of numbers used to represent the window hierarchy identifier are all N, N is any positive integer greater than 1, the first (N−1) numbers are identical, and the $N^{th}$ number is different, a smaller sum of numbers indicates a higher window hierarchy identifier. For example, the window hierarchy identifier represented by (1, 2) is higher than a window hierarchy identifier represented by (1, 5). A window corresponding to a window hierarchy identifier (1, n) (n being any positive integer greater than or equal to 1) is a child window of a window corresponding to a window hierarchy identifier (1); and a window corresponding to a window hierarchy identifier (1, n, m) is a child window of the window corresponding to the window hierarchy identifier (1, n). It can be learned based on the foregoing description that a window hierarchy identifier corresponding to a child window is higher than a window hierarchy identifier corresponding to a parent window of the child window.

In step S606, image synthesis processing is performed on the plurality of window image data according to the window hierarchy identifiers, to obtain user interface image to be displayed.

Because the window hierarchy identifiers represent the hierarchical relationship between the windows, image synthesis processing is performed on the plurality of window image data according to an order of the hierarchical relationship from high to low.

In step S607, a notification message carrying the user interface image is transmitted to a user terminal corresponding to the user identifier, so that the user terminal displays the user interface image on a user interface.

This step can be the same as step S404, and details are not described herein again.

Figure 6B:
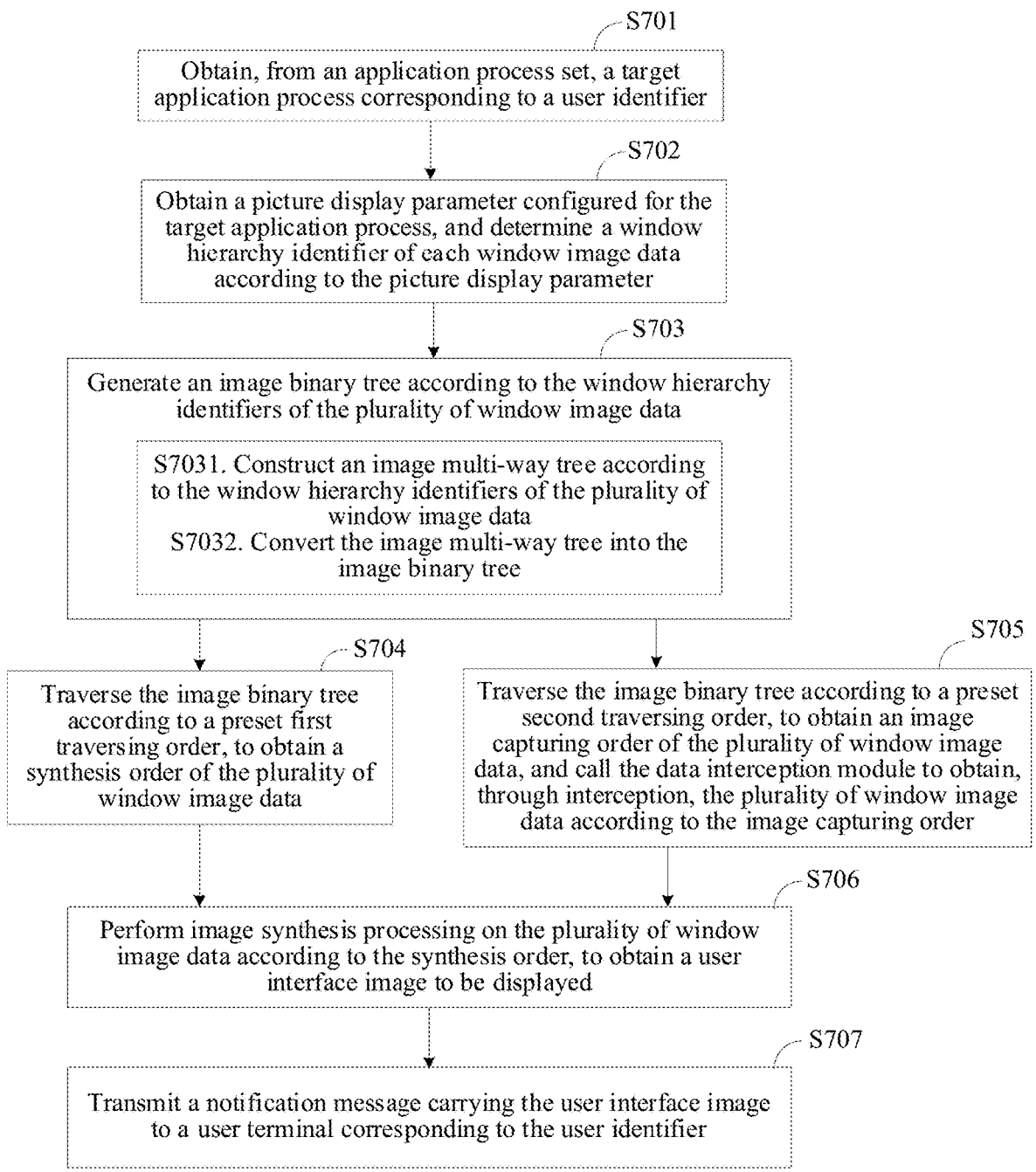
FIG. 6b is a schematic flowchart of still another image obtaining method according to an embodiment of this disclosure.

FIG. 6b is a schematic flowchart of still another image obtaining method according to an embodiment of the disclosure. The image obtaining method described in FIG. 6b may be performed by a server, and for example, may be performed by a processor of the server. For example, the method is applicable to the application server 101 shown in FIG. 1 or the application server 201 shown in FIG. 2, and the application server is configured to execute an application process set that provides service support for implementing an application function of a target application. The image obtaining method described in FIG. 6b may include the following steps:

In step S701, a target application process corresponding to a user identifier is obtained from an application process set.

This step can be the same as step 401, and details are not described herein again.

In step S702, a picture display parameter configured for the target application process is obtained, and a window hierarchy identifier of each window image data is determined according to the picture display parameter.

This step can be the same as step 605, and details are not described herein again.

In step S703, an image binary tree is generated according to the window hierarchy identifiers of the plurality of window image data.

To improve convenience, in this embodiment of the disclosure, an image binary tree is generated according to the window hierarchy identifiers of the plurality of window image data. The image binary tree may include a plurality of binary tree nodes, and each binary tree node stores a window hierarchy identifier.

In an embodiment, the generating an image binary tree according to the window hierarchy identifiers of the plurality of window image data may include:

In step S7031, an image multi-way tree is constructed according to the window hierarchy identifiers of the plurality of window image data.

The image multi-way tree includes N hierarchies, and each hierarchy includes M nodes, where N and M are both positive integers greater than or equal to 1. Two adjacent hierarchies in the image multi-way tree include a parent node and a child node sharing a parent-child relationship. Nodes having the same parent node in the same hierarchy of the image multi-way tree are sibling nodes.

In step S7032, the image multi-way tree is converted into the image binary tree.

A first node in each hierarchy of the image multi-way tree is converted into a left node of the image binary tree, and another node that is a sibling node of the first node is converted into a right node of the image binary tree.

Figure 7A:
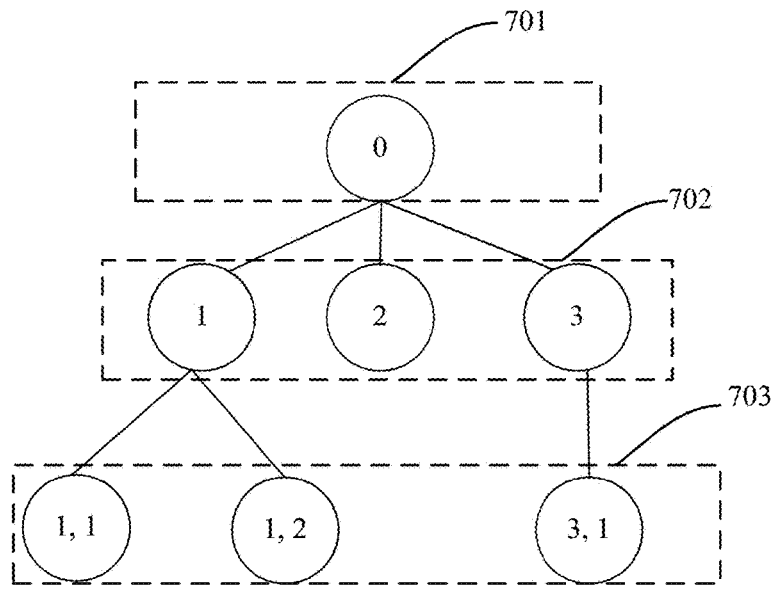
FIG. 7a is a schematic diagram of an image multi-way tree according to an embodiment of this disclosure.

For example, it is assumed that the image multi-way tree constructed according to the window hierarchy identifiers of the plurality of window image data is shown in FIG. 7a. It is assumed that the image multi-way tree includes three hierarchies. As shown in hierarchies 701-703, numbers in a node of each hierarchy represent a window hierarchy identifier of window image data corresponding to the node. It can be seen from the figure that the hierarchy 701 includes one node, and the node included in the hierarchy 701 may be referred to as a root node. In this embodiment of the disclosure, the root node is desktop image data of the user terminal. The desktop image data of the user terminal may be transmitted by the application server after receiving a selection operation of the desktop image data entered by the user and received by the user terminal. The hierarchy 702 includes three nodes, and the hierarchy 703 includes three nodes.

Windows corresponding to window hierarchy identifiers (1, 1) and (1, 2) in the hierarchy 702 are child windows of a window corresponding to a window hierarchy identifier 1. Therefore, a parent node of child nodes represented by the window hierarchy identifiers (1, 1) and (1, 2) is a node represented by the window hierarchy identifier 1, and the nodes represented by the window hierarchy identifiers (1, 1) and (1, 2) are sibling nodes. Similarly, nodes represented by window hierarchy identifiers 1, 2, and 3 are sibling nodes.

Figure 7B:
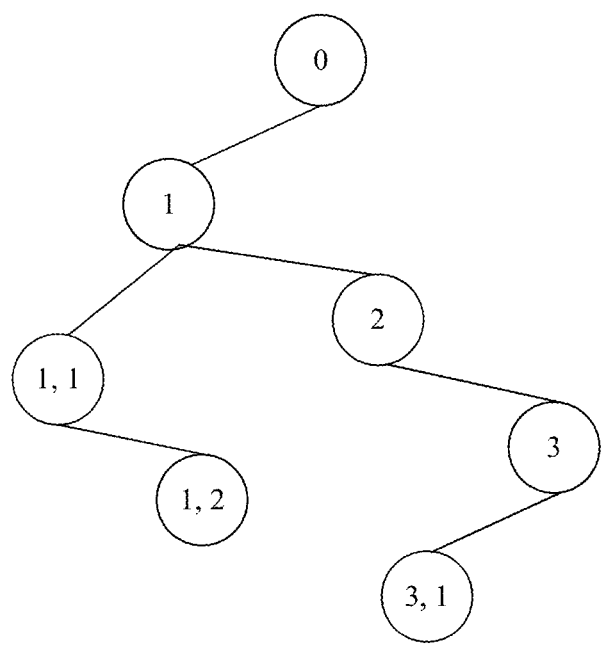
FIG. 7b is a schematic diagram of an image binary tree according to an embodiment of this disclosure.

Converting the image multi-way tree shown in FIG. 7a into an image binary tree can refer to: converting a first node in each of the hierarchies 701-703 in the image multi-way tree into a left node of the image binary tree. For example, the first node in the hierarchy 701 is a node represented by a window hierarchy identifier 0, and this node is used as a left node of the image binary tree. No other nodes are included in the hierarchy 701, and the hierarchy 702 is continuously converted. In the hierarchy 702, the first node is a node represented by the window hierarchy identifier 1, and this node is still used as a left node of the image binary tree. The hierarchy 702 further includes two sibling nodes of the node represented by the window hierarchy identifier 1, namely, a node represented by a window hierarchy identifier 2 and a node represented by a window hierarchy identifier 3, and the two nodes are successively used as right nodes of the image binary tree. All nodes in the image multi-way tree are traversed according to the foregoing process, and the image binary tree as shown in FIG. 7b can be obtained after all the nodes are traversed.

It is to be understood that successively using the node represented by the window hierarchy identifier 2 and the node represented by the window hierarchy identifier 3 as the right nodes of the image binary tree may be understood as: the node represented by the window hierarchy identifier 2 is used as the right node of the node represented by the window hierarchy identifier 1, and the node represented by the window hierarchy identifier 3 is used as the right node of the node represented by the window hierarchy identifier 2.

In step S704, the image binary tree is traversed according to a preset first traversing order, to obtain a synthesis order of the plurality of window image data.

The preset first traversing order (e.g., binary tree image synthesis) may refer to pre-order traversing, and the pre-order traversing refers to: root node-left node-right node. For example, a result of the pre-order traversing in the image binary tree shown in FIG. 7b is: 0-1-(1, 1)-(1, 2)-2-3-(3, 1). The image binary tree is traversed according to a preset traversing order of binary tree display, to obtain a synthesis order of the plurality of window image data: 0-1-(1, 1)-(1, 2)-2-3-(3, 1).

In step S705, the image binary tree is traversed according to a preset second traversing order, to obtain an image capturing order of the plurality of window image data, and the data interception module is called to obtain, through interception, the plurality of window image data according to the image capturing order.

In an embodiment, the preset second traversing order (e.g., binary image obtaining) may refer to post-order traversing, and a traversing order of the post-order traversing is: left node-right node-root node. For example, a result of the post-order traversing in the image binary tree shown in FIG. 7b is: (1, 1)-(1, 2)-(3, 1)-3-2-1-0. The image binary tree is traversed according to a preset traversing order of binary tree obtaining, to obtain an image capturing order of the plurality of window image data: (1, 1)-(1, 2)-(3, 1)-3-2-1-0.

In an embodiment, after window image data are obtained, image synthesis processing may be performed on the window image data, to obtain a user interface image to be displayed.

In step S706, image synthesis processing is performed on the plurality of window image data according to the synthesis order, to obtain a user interface image to be displayed.

In an embodiment, an implementation of step 706 may be: allocating a sub-canvas for each window image data, placing the corresponding window image data on a corresponding sub-canvas, and combining the sub-canvas according to the foregoing synthesis order, to obtain the user interface image to be displayed.

It is to be understood that the combination is performed according to the foregoing synthesis order, so that a window image data with a higher window hierarchy identifier is combined later. In this way, in the obtained user interface image, a window image data with a higher window hierarchy identifier covers a window image data with a lower window hierarchy identifier.

In step S707, a notification message carrying the user interface image is transmitted to a user terminal corresponding to the user identifier.

This step can be the same as step 404, and details are not described herein again.

Figure 6C:
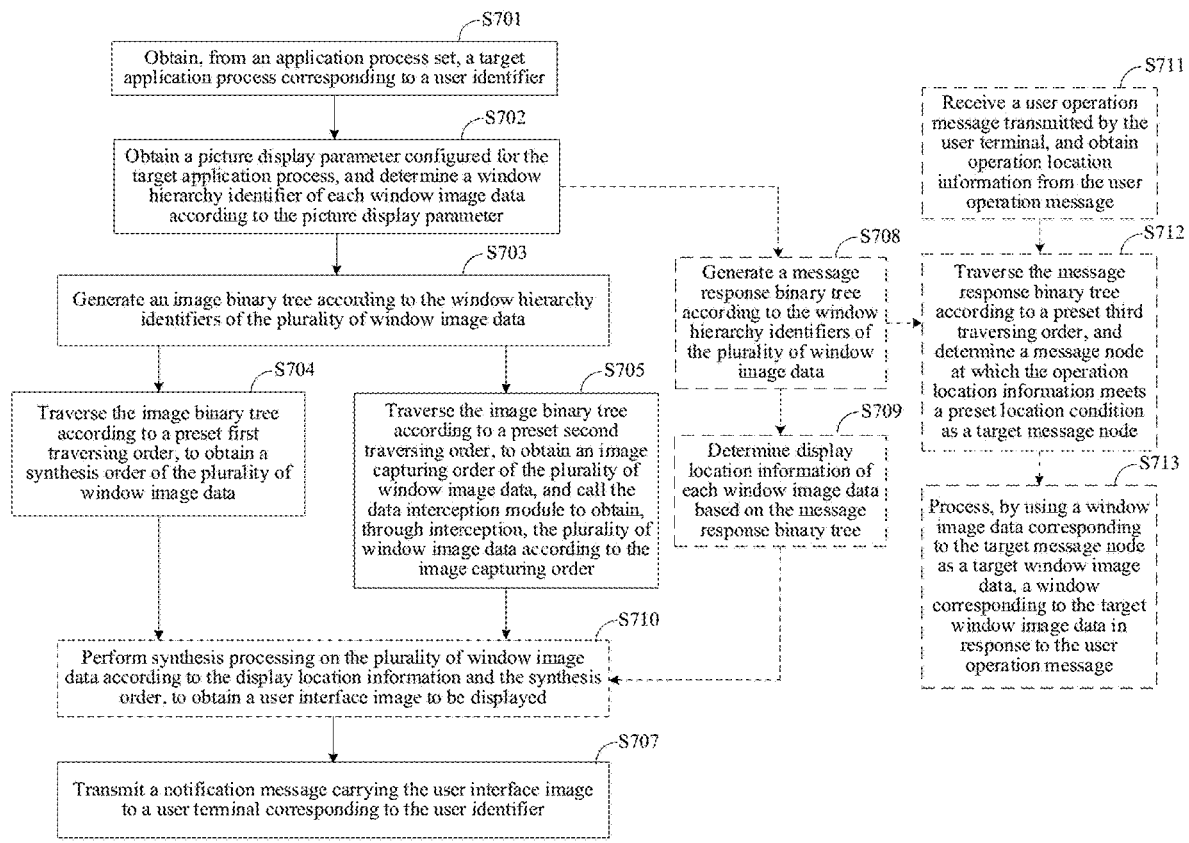
FIG. 6c is a schematic flowchart of another image obtaining method according to an embodiment of this disclosure.

In another embodiment of the disclosure, FIG. 6c is a schematic flowchart of another image obtaining method according to an embodiment of the disclosure. The image obtaining method may be performed by a server, and for example, may be performed by a processor of the server. For example, the method is applicable to the application server 101 shown in FIG. 1 or the application server 201 shown in FIG. 2. As shown in FIG. 6c, on the basis of the embodiment described in FIG. 6b, after step S702, the following may be further performed:

In step S708, a message response binary tree is generated according to the window hierarchy identifiers of the plurality of window image data.

The message response binary tree includes a plurality of message nodes, and each message node records window location information and window size information of corresponding window image data. For brevity of operation, when the message response binary tree is generated according to the window hierarchy identifiers of the plurality of window image data, the same method as step S703 may be used. In this way, the message response binary tree and the image binary tree have the same structure. For example, the message response binary tree generated according to the window hierarchy identifiers of the plurality of window image data may likewise be as shown in FIG. 7b.

Each node of the image binary tree stores a window hierarchy identifier of a window image data. Unlike the image binary tree, each node in the message response binary tree not only stores a window hierarchy identifier of each window image data, but also stores window location information and window size information corresponding to the window image data. The window location information may include coordinates of a window, and the coordinates of the window may be represented in the form of pixel coordinates such as (3 pixels, 6 pixels), or may be represented in the form of world coordinates such as (10, 15). The window size information may include information such as a width and a height of the window.

In step S709, display location information of each window image data is determined based on the message response binary tree.

The display location information may include any one or both of the window location information and window size information of the window image data.

In step S710, synthesis processing is performed on the plurality of window image data according to the display location information and the synthesis order, to obtain a user interface image to be displayed.

When the plurality of window image data is synthesized, after the plurality of window image data are determined, where the plurality of window image data is located further needs to be determined. For example, as shown in FIG. 5b to FIG. 5d, after the "homepage" window image data and the "store" window image data are determined, a size with which and a location at which the two window image data are combined further need to be determined, to obtain the user interface image shown in FIG. 3b. Therefore, when the plurality of window image data are synthesized, the display location information of the plurality of window image data may be obtained by using the message response binary tree.

Figure 9:
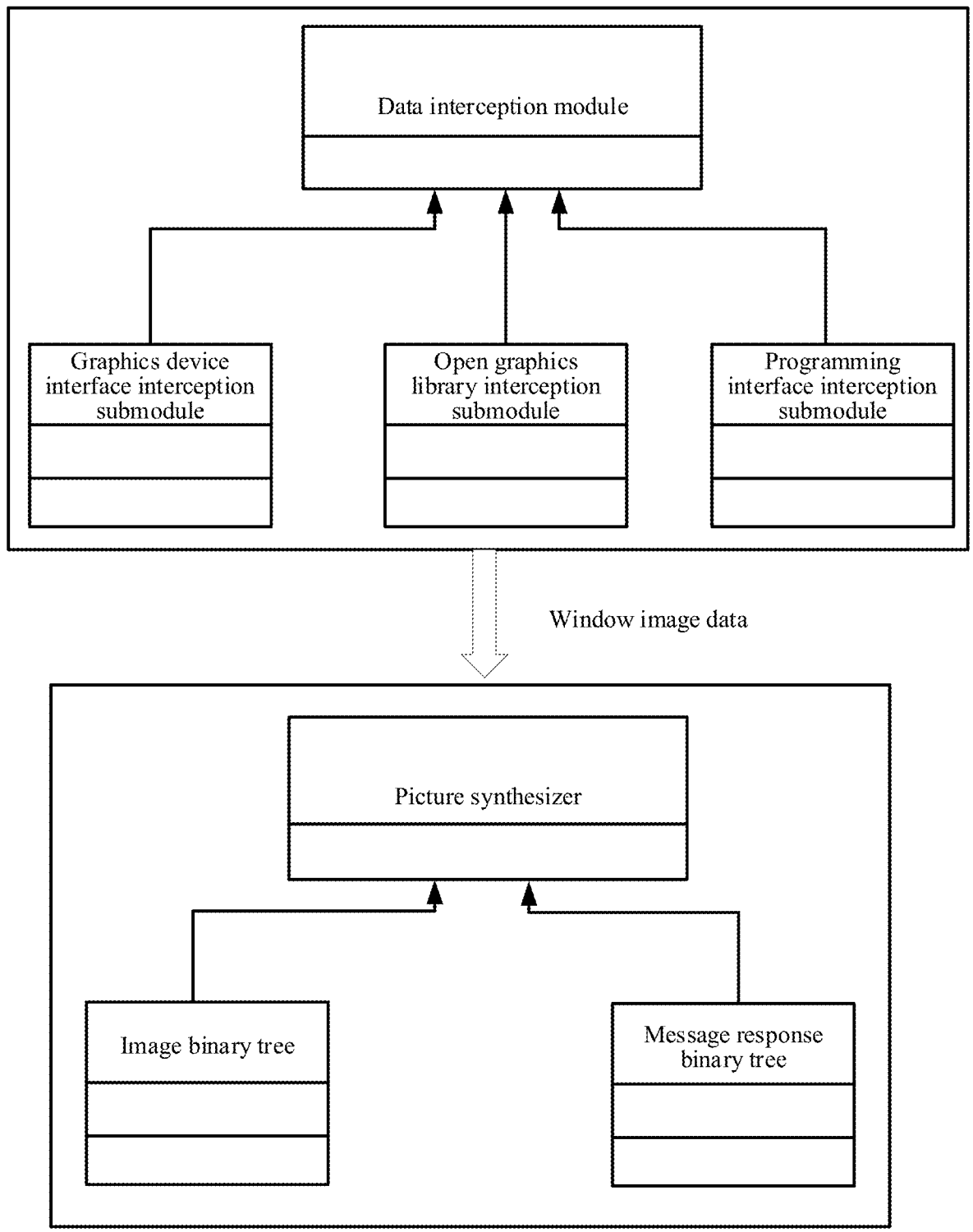
FIG. 9 is a schematic diagram of image synthesis processing according to an embodiment of this disclosure.

Based on the foregoing description, an embodiment of the disclosure provides a schematic diagram of image synthesis processing as shown in FIG. 9. In FIG. 9, a data interception module is configured to obtain a plurality of window image data in a target application process. An application server calls a picture synthesizer to perform image synthesis processing on the plurality of window image data according to an image binary tree and a message response binary tree.

In an embodiment, in step S709, an implementation of determining display location information of each window image data based on the message response binary tree may include the following.

For first window image data in the plurality of window image data (e.g., the first window image data being any window image data in the plurality of window image data), when it is detected that image synthesis processing is currently performed on the first window image data, the application server may obtain a window hierarchy identifier of the first window image data according to the image binary tree; window location information and window size information corresponding to the window hierarchy identifier of the first window image data are searched from the message response binary tree; and the found window location information and window size information are determined as display location information of the first window image data.

In another embodiment, in addition to being applied to image synthesis processing, the message response binary tree may be further used to search a target window image data corresponding to a user operation message, so that the application server can process the target window image data in response to the user operation message. The user operation message is an operation related to the user interface image and entered by the user by using the user terminal. For example, FIG. 6c further includes the following steps:

In step S711, a user operation message transmitted by the user terminal is received, and operation location information is obtained from the user operation message.

The operation location information included in the user operation message refers to location information of a location at which the user inputs the operation. For example, the user taps, double-taps, or presses and holds a location in the user interface image, and location information of the location is determined as the operation location information.

In step S712, the message response binary tree is traversed according to a preset third traversing order, and a message node at which the operation location information meets a preset location condition is determined as a target message node.

For example, the target message node is the first message node found in the message response binary tree that meets the preset location condition. In an embodiment, the operation location information meets a preset location condition when the operation location information is within a range defined by window location information and window size information recorded by the target message node.

In step S713, a window corresponding to the target window image data is processed, by using a window image data corresponding to the target message node as a target window image data, in response to the user operation message.

Figure 10A:
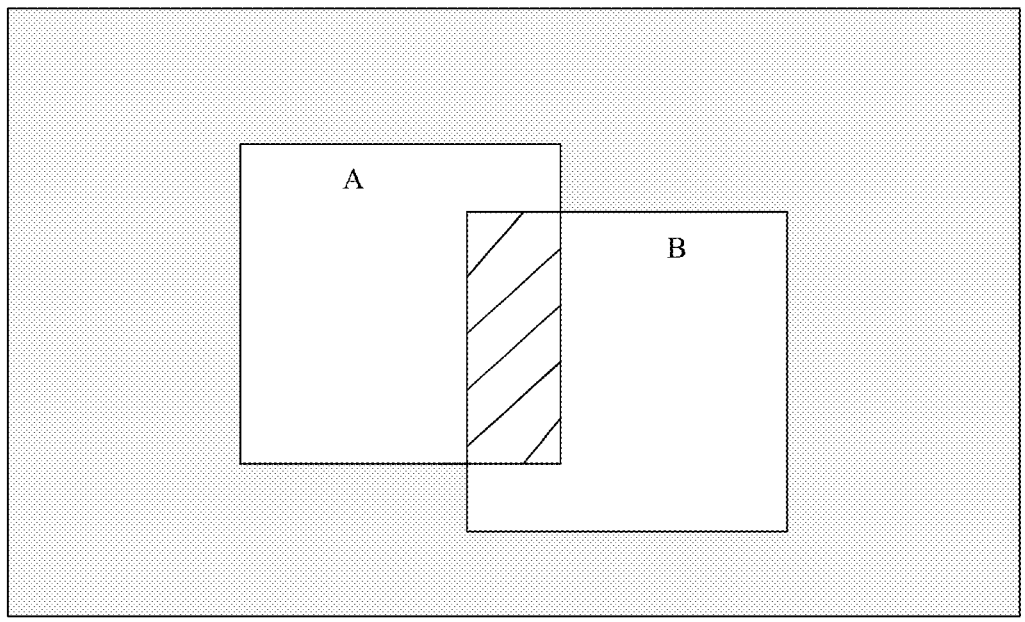
FIG. 10a is a desktop view of an application server according to an embodiment of this disclosure.
Figure 10B:
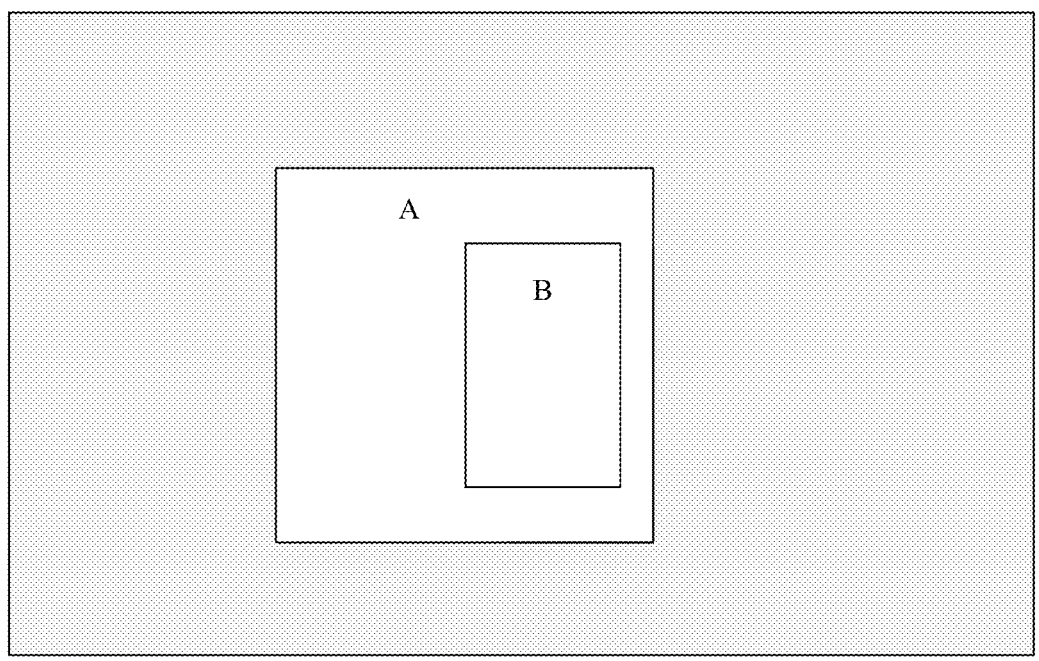
FIG. 10b is a schematic diagram of a user interface image according to an embodiment of this disclosure.

Because application processes corresponding to a plurality of user identifiers run in the application server, user interface images corresponding to the plurality of user identifiers are displayed in the application server, and the user interface images corresponding to different user identifiers may overlap, as shown in FIG. 10a. In FIG. 10a, A and B represent user interface images corresponding to different user identifiers. A plurality of window image data in a user interface image corresponding to the same user identifier may also overlap, as shown in FIG. 10b. In FIG. 10b, A and B represent two window image data in the user interface image corresponding to the same user identifier.

Different user identifiers correspond to different application processes, and different application processes correspond to different picture display parameters. Because an image binary tree and a message response binary tree are generated according to a window hierarchy identifier determined by a picture display parameter, image binary trees and message response binary trees of different application processes are also different. Therefore, it may be understood that message response binary trees corresponding to different user identifiers are different.

For the case of FIG. 10a, if a location indicated by the operation location information included in the user operation message is located in an overlapping area of A and B, the application server needs to determine a user interface image which the user operation message entered by the user is for. For example, which user interface image the currently received user operation message is for may be determined according to message response binary trees corresponding to different user identifiers.

For the case of FIG. 10b, the application server needs to determine which window image data in the user interface image the user operation message is for. For example, the message response binary tree may be traversed according to a preset third traversing order (e.g., binary tree window search), to determine the target message node, and further determine the target window image data corresponding to the target message node.

The preset third traversing order may refer to middle-order traversing, and the middle-order traversing refers to traversing a binary tree in an order of: left node-root node-right node. For example, assuming that the message response binary tree is shown in FIG. 7b, a result of the middle-order traversing is: (1, 1)-(1, 2)-1-2-(3, 1)-(3)-0.

Figure 11:
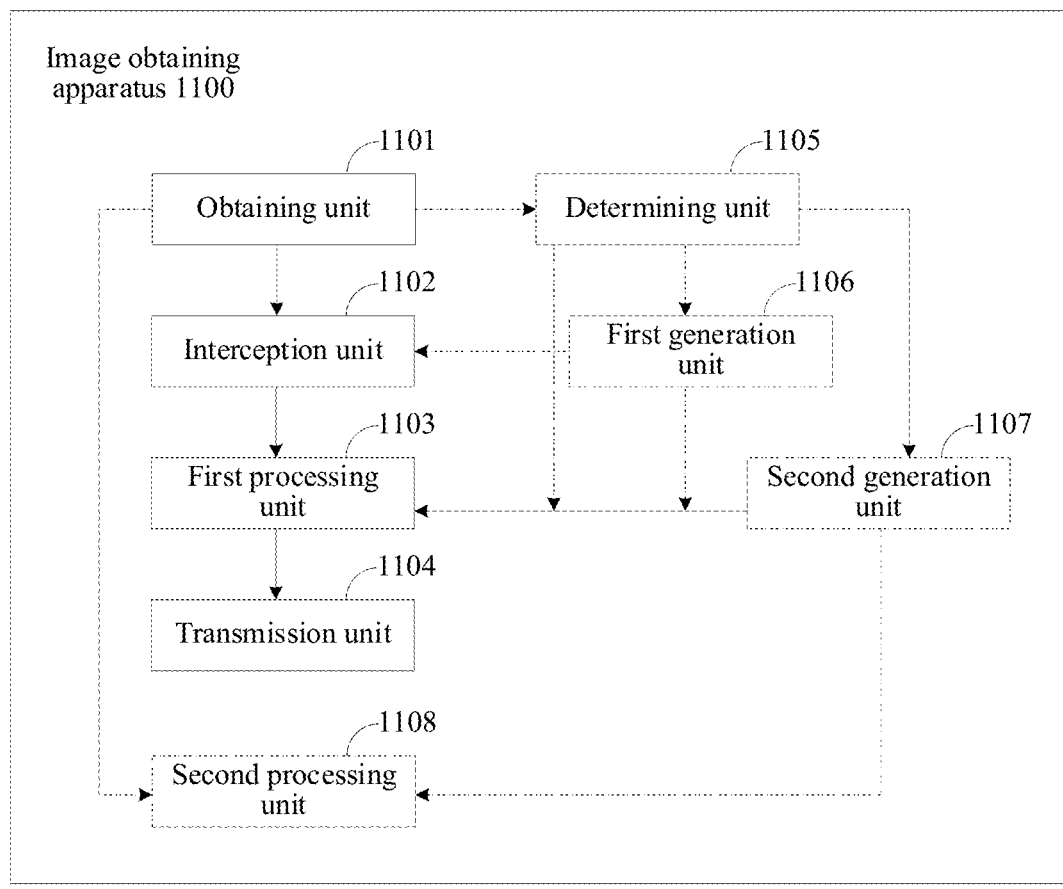
FIG. 11 is a schematic structural diagram of an image obtaining apparatus according to an embodiment of this disclosure.

Based on the description of the foregoing image obtaining method, an embodiment of the disclosure further discloses an image obtaining apparatus. The image obtaining apparatus is applicable to a server, for example, the application server 101 shown in FIG. 1 or the application server 201 shown in FIG. 2. The application server is configured to execute an application process set that provides service support for implementing an application function of a target application. The image obtaining apparatus can perform the methods shown in FIG. 4, and FIG. 6a to FIG. 6c. Referring to FIG. 11, an image obtaining apparatus 1100 may operate an obtaining unit 1101, an interception unit 1102, a first processing unit 1103, and a transmission unit 1104. One or more of units of the apparatus can be implemented by processing circuitry, software, or a combination thereof, for example.

The obtaining unit 1101 is configured to obtain, from an application process set, a target application process corresponding to a user identifier.

The interception unit 1102 is configured to call, when detecting that an image rendering function in the target application process obtained by using the obtaining unit 1101 is called, a data interception module to intercept a plurality of window image data currently generated.

The first processing unit 1103 is configured to perform image synthesis processing on the plurality of window image data intercepted by using the interception unit 1102, to obtain a user interface image to be displayed.

The transmission unit 1104 is configured to transmit a notification message carrying the user interface image obtained by using the first processing unit 1103 to a user terminal corresponding to the user identifier, so that the user terminal displays the user interface image on a user interface.

In an embodiment, the obtaining unit 1101 is further configured to obtain a picture display parameter configured for the target application process.

The apparatus 1100 further includes a determining unit 1105. The determining unit 1105 is configured to determine a window hierarchy identifier of each window image data according to the picture display parameter obtained by using the obtaining unit 1102. The first processing unit 1103 is further configured to perform image synthesis processing on the plurality of window image data according to the window hierarchy identifiers determined by using the determining unit 1105.

In an embodiment, the apparatus 1100 further includes a first generation unit 1106. The first generation unit 1106 is configured to generate an image binary tree according to the window hierarchy identifiers of the plurality of window image data determined by using the determining unit 1105. The first processing unit 1103 is further configured to traverse the image binary tree generated by using the first generation unit 1106 according to a preset first traversing order, to obtain a synthesis order of the plurality of window image data; and perform image synthesis processing on the plurality of window image data according to the synthesis order.

In an embodiment, the first generation unit 1106 is further configured to construct an image multi-way tree according to the window hierarchy identifiers of the plurality of window image data determined by using the determining unit 1105; and convert the image multi-way tree into the image binary tree.

In an embodiment, the apparatus 1100 further includes a first generation unit 1106. The first generation unit 1106 is configured to generate an image binary tree according to the window hierarchy identifiers of the plurality of window image data determined by using the determining unit 1105. The interception unit 1102 is configured to traverse the image binary tree generated by using the first generation unit 1106 according to a preset second traversing order, to obtain an image capturing order of the plurality of window image data; and call the data interception module to obtain, through interception, the plurality of window image data according to the image capturing order.

In an embodiment, the interception unit 1102 is configured to determine a rendering manner included in the image rendering function; determine a data interception submodule corresponding to the rendering manner in the data interception module according to the rendering manner; and call the data interception submodule to intercept the plurality of window image data obtained when the image rendering function is executed.

In an embodiment, the apparatus 1100 further includes a second generation unit 1107. The second generation unit 1107 is configured to generate a message response binary tree according to the window hierarchy identifiers of the plurality of window image data determined by using the determining unit 1105. The first processing unit 1103 is configured to determine display location information of each window image data based on the message response binary tree generated by using the second generation unit 1107; and perform synthesis processing on the plurality of window image data according to the display location information and the synthesis order.

In an embodiment, the message response binary tree includes a plurality of message nodes, and the obtaining unit 1101 is further configured to receive a user operation message transmitted by the user terminal, and obtain operation location information from the user operation message.

The apparatus 1100 further includes a second processing unit 1108. The second processing unit 1108 is configured to traverse the message response binary tree generated by using the second generation unit 1107 according to a preset third traversing order, and determine a message node at which the operation location information obtained by using the obtaining unit 1101 meets a preset location condition as a target message node; and process, by using a window image data corresponding to the target message node as a target window image data, a window corresponding to the target window image data in response to the user operation message.

According to another embodiment of the disclosure, the units of the image obtaining apparatus shown in FIG. 11 may be separately or wholly combined into one or several other units, or one (or more) of the units herein may further be divided into a plurality of units of smaller functions. In this way, same operations may be implemented, and the implementation of the technical effects of the embodiments of the disclosure is not affected. The foregoing units are divided based on logical functions. In an actual application, a function of one unit may also be implemented by a plurality of units, or functions of a plurality of units are implemented by one unit. In other embodiments of the disclosure, the image obtaining apparatus may also include other units. In an actual application, the functions may also be cooperatively implemented by other units and may be cooperatively implemented by a plurality of units.

According to another embodiment of the disclosure, a computer program (including program code) that can perform the steps in the corresponding method shown in FIG. 4, or FIG. 6a to FIG. 6c may be run on a general computing device, such as a computer, which includes processing elements and storage elements such as a central processing unit (CPU), a random access memory (RAM), and a read-only memory (ROM), to construct the image obtaining apparatus shown in FIG. 11 and implement the image obtaining method in the embodiments of the disclosure. The CPU is one example of processing circuitry. The computer program may be recorded on, for example, a computer-readable recording medium such as a non-transitory computer-readable storage medium, and may be loaded into the foregoing computing device by using the computer-readable recording medium and run on the computing device.

Figure 12:
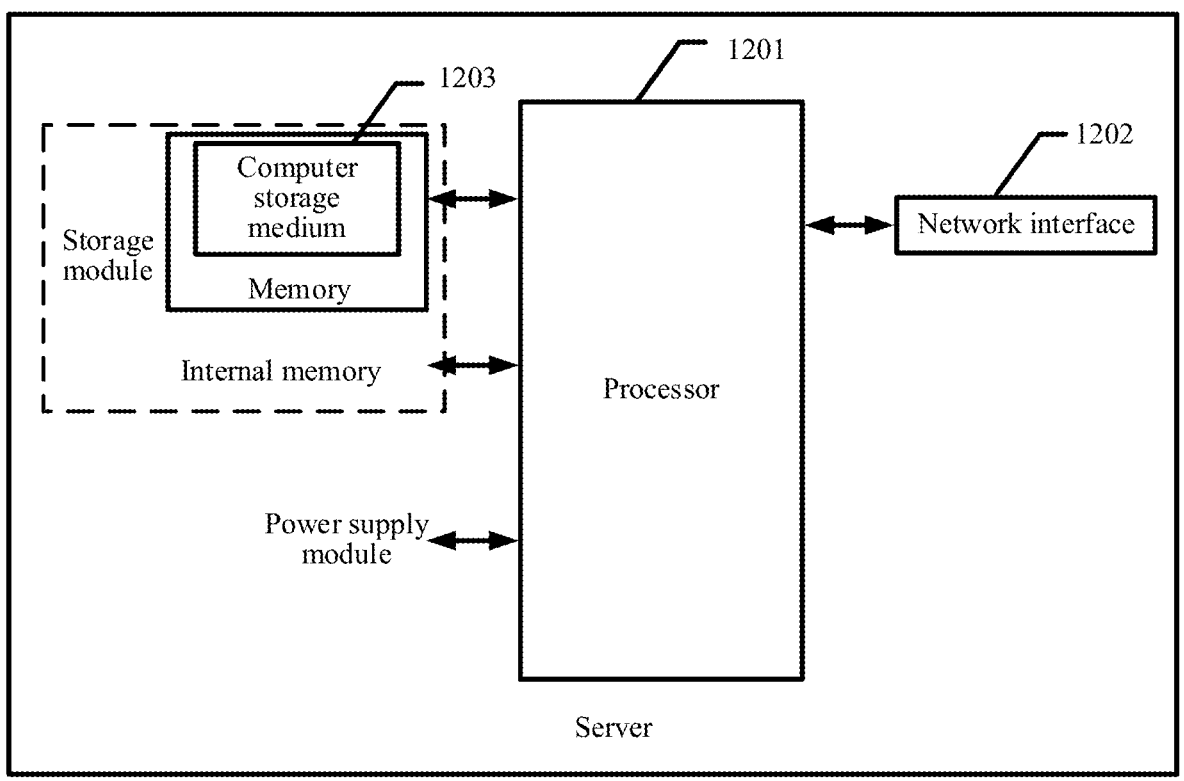
FIG. 12 is a schematic structural diagram of a server according to an embodiment of this disclosure.

Based on the descriptions of the foregoing method embodiments and apparatus embodiments, an embodiment of the disclosure further provides a server. The server may be the application server 101 shown in FIG. 1 or the application server 201 shown in FIG. 2, and the server is configured to execute an application process set that provides service support for implementing an application function of a target application. Referring to FIG. 12, the server includes at least processing circuitry (e.g., a processor 1201), a network interface 1202, and a computer storage medium 1203. The network interface 1202 is configured to receive or transmit data when connected to a network.

The computer storage medium 1203 may be stored in a memory of the server. The computer storage medium 1203 is configured to store a computer program. The computer program includes program instructions. The processor 1201 is configured to execute the program instructions stored in the computer storage medium 1203. The processor 1201, or referred to as a central processing unit (CPU), is a computing core and a control core of a terminal, is suitable for implementing one or more instructions, and is specifically suitable for loading and executing one or more instructions to implement a corresponding method procedure or a corresponding function. In an embodiment, the processor 1201 described in this embodiment of the disclosure or other processing circuitry may be configured to perform the foregoing image obtaining method described in FIG. 4, and FIG. 6a to FIG. 6c.

An embodiment of the disclosure further provides a computer storage medium such as a non-transitory computer-readable storage medium. The computer storage medium is a memory device in a terminal and is configured to store programs and data. As can be understood, the computer storage medium herein may include an internal storage medium of the terminal and may further include an extended storage medium supported by the terminal. The computer storage medium provides storage space, and the storage space stores an operating system of the terminal. In addition, the storage space further stores one or more instructions suitable to be loaded and executed by the processor 1201. The instructions may be one or more computer programs (including program code). The computer storage medium herein may be a high-speed RAM or a non-volatile memory, for example, at least one magnetic disk memory. Optionally, the computer storage medium may further be at least one computer storage medium located away from the foregoing processor.

The term unit (and other similar terms such as module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more unit. Moreover, each unit can be part of an overall unit that includes the functionalities of the unit.

In an embodiment, the one or more instructions stored in the computer storage medium may be loaded and executed by the processor 1201, to implement corresponding steps of the method in the foregoing embodiments related to the image obtaining method. In a specific implementation, the one or more instructions in the computer storage medium are loaded by the processor 1201 to perform the foregoing image obtaining method in FIG. 4, and FIG. 6a to FIG. 6c.

What is disclosed above is merely exemplary embodiments of the disclosure, and is not intended to limit the scope of the claims of the disclosure. Therefore, equivalent variations made in accordance with the disclosure shall fall within the scope of the disclosure.

What is claimed is:

1. An image obtaining method, comprising:
    obtaining, by processing circuitry from an application process set, a target application process corresponding to a user identifier;
    obtaining, via a data obtaining module, a plurality of window image data that is currently generated when an image rendering function in the target application process is called;
    generating an image binary tree by converting an image multi-way tree constructed according to window hierarchy identifiers corresponding to each of the plurality of window image data;
    performing image synthesis processing on the plurality of window image data, to obtain a user interface image to be displayed, by traversing the image binary tree; and
    transmitting a notification message that includes the user interface image to a user terminal corresponding to the user identifier for display on a user interface.

2. The method according to claim 1, wherein
    the plurality of window image data is of a plurality of windows displayed at different layers, and
    the image synthesis processing is performed on the plurality of window image data based on the different layers associated with the plurality of window image data.

3. The method according to claim 1, further comprising:
    obtaining a picture display parameter configured for the target application process; and
    determining a window hierarchy identifier of each window image data of the plurality of window image data according to the picture display parameter, wherein
    the performing the image synthesis processing includes performing the image synthesis processing on the plurality of window image data according to the window hierarchy identifiers.

4. The method according to claim 3, wherein
    the generating the image binary tree is performed according to the window hierarchy identifiers of the plurality of window image data, and
    the performing the image synthesis processing comprises:
        traversing the image binary tree according to a preset first traversing order, to obtain a synthesis order of the plurality of window image data; and
        performing the image synthesis processing on the plurality of window image data according to the synthesis order.

5. The method according to claim 4, wherein the generating comprises:
    constructing the image multi-way tree according to the window hierarchy identifiers of the plurality of window image data; and
    converting the image multi-way tree into the image binary tree.

6. The method according to claim 3, wherein
    the generating the image binary tree is performed according to the window hierarchy identifiers of the plurality of window image data, and
    the obtaining the plurality of window image data comprises:
        traversing the image binary tree according to a preset second traversing order, to obtain an image capturing order of the plurality of window image data; and
        calling the data obtaining module to obtain the plurality of window image data according to the image capturing order.

7. The method according to claim 1, wherein the obtaining the plurality of window image data comprises:
    determining a rendering manner of the image rendering function;
    determining a data capture submodule corresponding to the rendering manner; and calling the data capture submodule to acquire the plurality of window image data obtained when the image rendering function is executed.

8. The method according to claim 4, further comprising:
generating a message response binary tree according to the window hierarchy identifiers of the plurality of window image data, wherein
the performing the image synthesis processing comprises:
determining display location information of each window image data of the plurality of window image data based on the message response binary tree; and
performing the image synthesis processing on the plurality of window image data according to the display location information and the synthesis order.

9. The method according to claim 8, wherein the message response binary tree comprises a plurality of message nodes, and the method further comprises:
receiving a user operation message transmitted by the user terminal;
obtaining operation location information from the user operation message;
traversing the message response binary tree according to a preset third traversing order;
determine a message node of the plurality of message nodes at which the operation location information meets a preset location condition as a target message node; and
processing, by using window image data corresponding to the target message node as target window image data, a window corresponding to the target window image data in response to the user operation message.

10. The method according to claim 9, wherein each of the plurality of message nodes records window location information and window size information of a corresponding window image data of the plurality of window image data; and
the operation location information meets the preset location condition when the operation location information is within a range defined by the window location information and the window size information recorded by the target message node.

11. An image obtaining apparatus, comprising:
processing circuitry configured to:
obtain, from an application process set, a target application process corresponding to a user identifier;
obtain, via a data obtaining module, a plurality of window image data that is currently generated when an image rendering function in the target application process is called;
generate an image binary tree by converting an image multi-way tree constructed according to window hierarchy identifiers corresponding to each of the plurality of window image data;
perform image synthesis processing on the plurality of window image data, to obtain a user interface image to be displayed, by traversing the image binary tree; and
transmit a notification message that includes the user interface image to a user terminal corresponding to the user identifier for display on a user interface.

12. The apparatus according to claim 11, wherein the processing circuitry is configured to:
obtain a picture display parameter configured for the target application process;
determine a window hierarchy identifier of each window image data of the plurality of window image data according to the picture display parameter; and
perform the image synthesis processing on the plurality of window image data according to the window hierarchy identifiers.

13. The apparatus according to claim 12, wherein the processing circuitry is configured to:
generate the image binary tree according to the window hierarchy identifiers of the plurality of window image data;
traverse the image binary tree according to a preset first traversing order, to obtain a synthesis order of the plurality of window image data; and
perform the image synthesis processing on the plurality of window image data according to the synthesis order.

14. The apparatus according to claim 13, wherein the processing circuitry is configured to:
construct the image multi-way tree according to the window hierarchy identifiers of the plurality of window image data; and
convert the image multi-way tree into the image binary tree.

15. The apparatus according to claim 12, the processing circuitry is configured to:
generate the image binary tree according to the window hierarchy identifiers of the plurality of window image data;
traverse the image binary tree according to a preset second traversing order, to obtain an image capturing order of the plurality of window image data; and
call the data obtaining module to obtain the plurality of window image data according to the image capturing order.

16. The apparatus according to claim 11, wherein the processing circuitry is configured to:
determine a rendering manner of the image rendering function;
determine a data capture submodule corresponding to the rendering manner; and
call the data capture submodule to acquire the plurality of window image data obtained when the image rendering function is executed.

17. The apparatus according to claim 13, the processing circuitry is configured to:
generate a message response binary tree according to the window hierarchy identifiers of the plurality of window image data;
determine display location information of each window image data of the plurality of window image data based on the message response binary tree; and
perform the image synthesis processing on the plurality of window image data according to the display location information and the synthesis order.

18. The apparatus according to claim 17, wherein the message response binary tree comprises a plurality of message nodes, and the processing circuitry is configured to:
receive a user operation message transmitted by the user terminal;
obtain operation location information from the user operation message;
traverse the message response binary tree according to a preset third traversing order;
determine a message node of the plurality of message nodes at which the operation location information meets a preset location condition as a target message node; and
process, by using window image data corresponding to the target message node as target window image data, a window corresponding to the target window image data in response to the user operation message.

19. The apparatus according to claim 18, wherein each of the plurality of message nodes records window location information and window size information of a corresponding window image data of the plurality of window image data; and the operation location information meets the preset location condition when the operation location information is within a range defined by the window location information and the window size information recorded by the target message node.

20. A non-transitory computer-readable storage medium, storing instructions, which when executed by a processor cause the processor to perform:

obtaining, from an application process set, a target application process corresponding to a user identifier;

obtaining, via a data obtaining module, a plurality of window image data that is currently generated when an image rendering function in the target application process is called;

generating an image binary tree by converting an image multi-way tree constructed according to window hierarchy identifiers corresponding to each of the plurality of window image data;

performing image synthesis processing on the plurality of window image data, to obtain a user interface image to be displayed, by traversing the image binary tree; and transmitting a notification message that includes the user interface image to a user terminal corresponding to the user identifier for display on a user interface.

* * * * *